US012682879B2

(12) United States Patent
Bezzola et al.

(10) Patent No.: US 12,682,879 B2
(45) Date of Patent: Jul. 14, 2026

(54) PERSONALIZED ESTIMATE OF A TRANSFER FUNCTION FROM AN IN-EAR EARBUD TO SOUND PRESSURE AT AN EAR DRUM

(71) Applicant: Samsung Electronics Co., Ltd., Suwon-si (KR)

(72) Inventors: Andri Bezzola, La Canada, CA (US); Adrian Celestinos Arroyo, Valencia, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 220 days.

(21) Appl. No.: 18/408,357

(22) Filed: Jan. 9, 2024

(65) Prior Publication Data

US 2025/0104685 A1 Mar. 27, 2025

Related U.S. Application Data

(60) Provisional application No. 63/540,316, filed on Sep. 25, 2023.

(51) Int. Cl.

| | |
|---|---|
| ***H04R 3/04*** | (2006.01) |
| ***G10K 11/178*** | (2006.01) |
| ***H04R 1/10*** | (2006.01) |
| ***H04R 1/22*** | (2006.01) |
| ***H04R 29/00*** | (2006.01) |

(52) U.S. Cl.

CPC .. *G10K 11/17821* (2018.01); *G10K 11/17854* (2018.01); *H04R 1/1016* (2013.01); *H04R 1/22* (2013.01); *H04R 3/04* (2013.01); *H04R 29/00* (2013.01)

(58) Field of Classification Search

CPC ......... H04R 1/1016; H04R 1/406; H04R 3/04
USPC .................................................. 381/98, 103
See application file for complete search history.

(56) References Cited

U.S. PATENT DOCUMENTS

| | | | |
|---|---|---|---|
| 8,571,224 | B2 | 10/2013 | Recker et al. |
| 10,614,791 | B2 * | 4/2020 | O'Connell ....... G10K 11/17833 |
| 10,823,960 | B1 * | 11/2020 | Cho ......................... H04R 3/04 |
| 11,470,428 | B2 | 10/2022 | Khaleghimeybodi et al. |
| 11,523,213 | B2 | 12/2022 | Mehra et al. |
| 11,523,240 | B2 * | 12/2022 | Ithapu .................... H04R 1/403 |

(Continued)

FOREIGN PATENT DOCUMENTS

CN 115767349 A 3/2023

*Primary Examiner* — Disler Paul

(74) *Attorney, Agent, or Firm* — Sherman IP LLP; Kenneth L. Sherman; Steven Laut

(57) ABSTRACT

One embodiment provides a method comprising obtaining, via a microphone of a hearable device, one or more measurements of a first individual transfer function from a transducer of the hearable device to a first sound pressure at the microphone. At least a portion of the hearable device is within proximity of an ear canal of an individual ear. The method further comprises determining, based on the one or more measurements of the first individual transfer function, a second individual transfer function from the first sound pressure to a second sound pressure at an eardrum within the ear canal. The method further comprises applying, based in part on the second individual transfer function, personalized equalization (PEQ) within the audio full range (low, mid and high frequencies) to an audio signal for reproduction via the hearable device.

25 Claims, 25 Drawing Sheets

(56) References Cited

U.S. PATENT DOCUMENTS

| | | | | |
|---|---|---|---|---|
| 11,721,355 | B2 * | 8/2023 | Eubank | H04S 7/304<br>704/500 |
| 11,889,267 | B2 * | 1/2024 | Denda | H04R 25/558 |
| 12,010,494 | B1 * | 6/2024 | Satongar | H04R 5/04 |
| 2022/0139366 | A1 | 5/2022 | Asada et al. | |

* cited by examiner

565

800

920

940

960

1000

1010

1160

1170

1180

1190

1200

2000

2100

PERSONALIZED ESTIMATE OF A TRANSFER FUNCTION FROM AN IN-EAR EARBUD TO SOUND PRESSURE AT AN EAR DRUM

CROSS-REFERENCE TO RELATED APPLICATIONS

The present application claims priority to U.S. Provisional Patent Application No. 63/540,316, filed on Sep. 25, 2023, incorporated by reference in its entirety.

TECHNICAL FIELD

One or more embodiments generally relate to equalization in audio, in particular, a personalized estimate of a transfer function from an in-ear earbud to sound pressure at an eardrum.

BACKGROUND

Equalization in audio reproduction is the process of adjusting the volume of different frequency bands within an audio signal.

SUMMARY

One embodiment provides a method comprising obtaining, via a microphone of a hearable device, one or more measurements of a first individual transfer function from a voltage signal at a transducer of the hearable device to a first pressure at the microphone. At least a portion of the hearable device is within proximity of an ear canal of an individual ear. The method further comprises determining, based on the one or more measurements of the first individual transfer function, a second individual transfer function from the first pressure to a second pressure at an eardrum within the ear canal. The method further comprises applying, based in part on the second individual transfer function, personalized equalization (PEQ) within the audio full range (low, mid and high frequencies) to an audio signal for reproduction via the hearable device.

Another embodiment provides a system comprising at least one processor and a non-transitory processor-readable memory device storing instructions that when executed by the at least one processor causes the at least one processor to perform operations. The operations include obtaining, via a microphone of a hearable device, one or more measurements of a first individual transfer function from a voltage signal at a transducer of the hearable device to a first pressure at the microphone. At least a portion of the hearable device is within proximity of an ear canal of an individual ear. The operations further include determining, based on the one or more measurements of the first individual transfer function, a second individual transfer function from the first pressure to a second pressure at an eardrum within the ear canal. The operations further include applying, based in part on the second individual transfer function, PEQ within the audio full range (low, mid and high frequencies) to an audio signal for reproduction via the hearable device.

One embodiment provides a non-transitory processor-readable medium that includes a program that when executed by a processor performs a method. The method comprises obtaining, via a microphone of a hearable device, one or more measurements of a first individual transfer function from a voltage signal at a transducer of the hearable device to a first pressure at the microphone. At least a portion of the hearable device is within proximity of an ear canal of an individual ear. The method further comprises determining, based on the one or more measurements of the first individual transfer function, a second individual transfer function from the first pressure to a second pressure at an eardrum within the ear canal. The method further comprises applying, based in part on the second individual transfer function, PEQ within the audio full range (low, mid and high frequencies) to an audio signal for reproduction via the hearable device.

Another embodiment provides a method comprising obtaining one or more measurements of a first sound pressure at a near-field (NF) microphone of a hearable device. At least a portion of the hearable device is within proximity of an ear simulator. The method further comprises obtaining one or more additional measurements of a second sound pressure at a drum reference point of the ear simulator, and personalizing a first individual transfer function at low frequencies for an individual ear based on the one or more measurements of the first sound pressure, the one or more additional measurements of the second sound pressure, a fitted model, and a low shelving filter. The first individual transfer function is used to estimate sound pressure at an eardrum within an ear canal of the individual ear when at least a portion of the hearable device is within proximity of the ear canal, and, at the low frequencies, the first individual transfer function compensates for air pressure leakage resulting from a lack of coupling between the hearable device and the ear canal.

One embodiment provides a system comprising at least one processor and a non-transitory processor-readable memory device storing instructions that when executed by the at least one processor causes the at least one processor to perform operations. The operations include obtaining one or more measurements of a first sound pressure at a NF microphone of a hearable device. At least a portion of the hearable device is within proximity of an ear simulator. The operations further include obtaining one or more additional measurements of a second sound pressure at a drum reference point of the ear simulator, and personalizing a first individual transfer function at low frequencies for an individual ear based on the one or more measurements of the first sound pressure, the one or more additional measurements of the second sound pressure, a fitted model, and a low shelving filter. The first individual transfer function is used to estimate sound pressure at an eardrum within an ear canal of the individual ear when at least a portion of the hearable device is within proximity of the ear canal, and, at the low frequencies, the first individual transfer function compensates for air pressure leakage resulting from a lack of coupling between the hearable device and the ear canal.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which.

DETAILED DESCRIPTION

Figure 1:
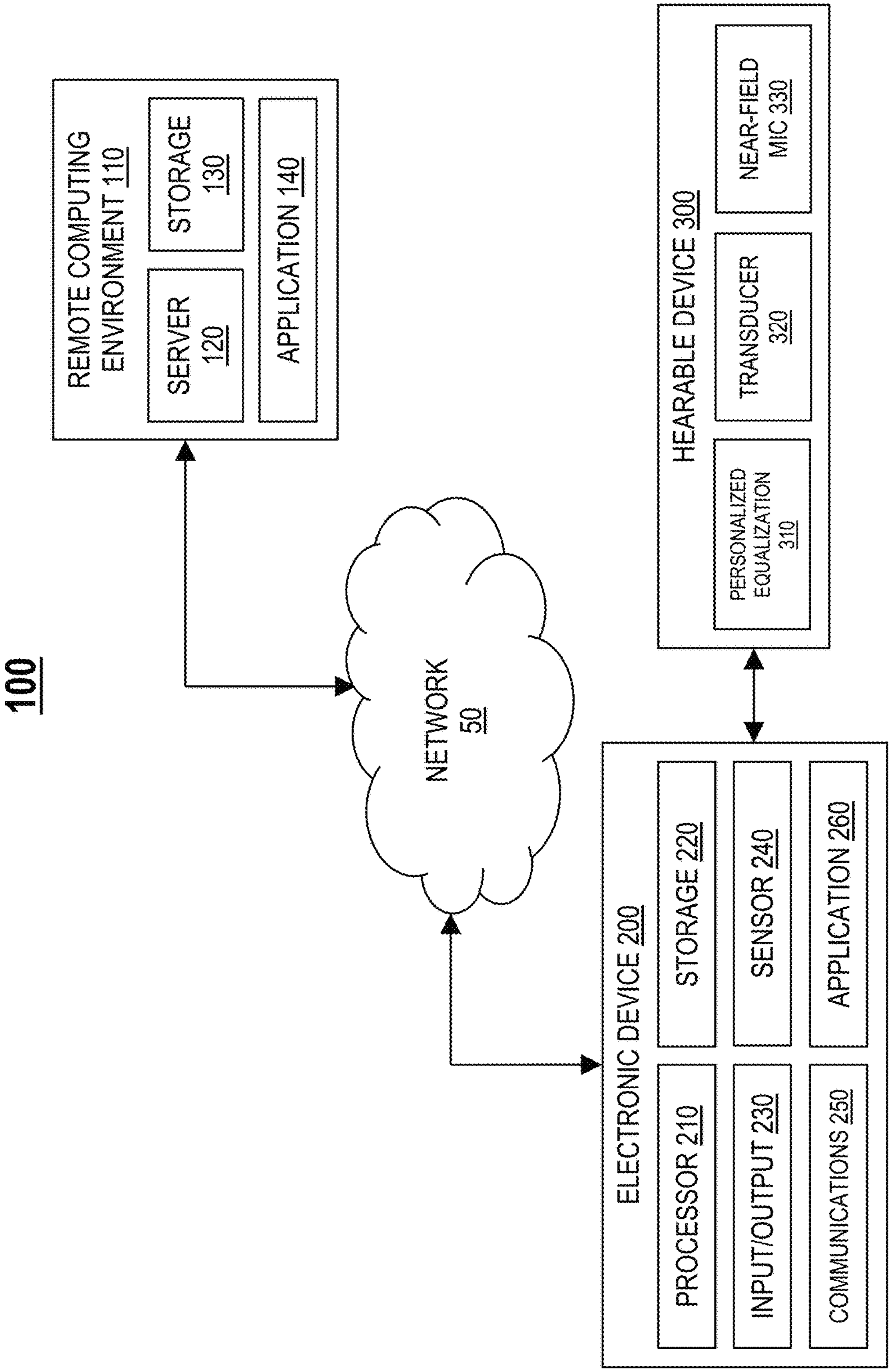
FIG. 1 illustrates an example computing architecture for personalized equalization (PEQ), in one or more embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments generally relate to equalization in audio, in particular, a personalized estimate of a transfer function from an in-ear earbud to sound pressure at an eardrum. One embodiment provides a method comprising obtaining, via a microphone of a hearable device, one or more measurements of a first individual transfer function from a transducer of the hearable device to a first pressure at the microphone. At least a portion of the hearable device is within proximity of an ear canal of an individual ear. The method further comprises determining, based on the one or more measurements of the first individual transfer function, a second individual transfer function from the first pressure to a second pressure at an eardrum within the ear canal. The method further comprises applying, based in part on the second individual transfer function, personalized equalization (PEQ) within the audio full range (low, mid and high frequencies) to an audio signal for reproduction via the hearable device.

Another embodiment provides a system comprising at least one processor and a non-transitory processor-readable memory device storing instructions that when executed by the at least one processor causes the at least one processor to perform operations. The operations include obtaining, via a microphone of a hearable device, one or more measurements of a first individual transfer function from a voltage signal at a transducer of the hearable device to a first pressure at the microphone. At least a portion of the hearable device is within proximity of an ear canal of an individual ear. The operations further include determining, based on the one or more measurements of the first individual transfer function, a second individual transfer function from the first pressure to a second pressure at an eardrum within the ear canal. The operations further include applying, based in part on the second individual transfer function, PEQ within the audio full range (low, mid and high frequencies) to an audio signal for reproduction via the hearable device.

One embodiment provides a non-transitory processor-readable medium that includes a program that when executed by a processor performs a method. The method comprises obtaining, via a microphone of a hearable device, one or more measurements of a first individual transfer function from a voltage signal at a transducer of the hearable device to a first pressure at the microphone. At least a portion of the hearable device is within proximity of an ear canal of an individual ear. The method further comprises determining, based on the one or more measurements of the first individual transfer function, a second individual transfer function from the first pressure to a second pressure at an eardrum within the ear canal. The method further comprises applying, based in part on the second individual transfer function, PEQ within the audio full range (low, mid and high frequencies) to an audio signal for reproduction via the hearable device.

Another embodiment provides a method comprising obtaining one or more measurements of a first sound pressure at a near-field (NF) microphone of a hearable device. At least a portion of the hearable device is within proximity of an ear simulator. The method further comprises obtaining one or more additional measurements of a second sound pressure at a drum reference point of the ear simulator, and personalizing a first individual transfer function at low frequencies for an individual ear based on the one or more measurements of the first sound pressure, the one or more additional measurements of the second sound pressure, a fitted model, and a low shelving filter. The first individual transfer function is used to estimate sound pressure at an eardrum within an ear canal of the individual ear when at least a portion of the hearable device is within proximity of the ear canal, and, at the low frequencies, the first individual transfer function compensates for air pressure leakage resulting from a lack of coupling between the hearable device and the ear canal.

One embodiment provides a system comprising at least one processor and a non-transitory processor-readable memory device storing instructions that when executed by the at least one processor causes the at least one processor to perform operations. The operations include obtaining one or more measurements of a first sound pressure at a NF microphone of a hearable device. At least a portion of the hearable device is within proximity of an ear simulator. The operations further include obtaining one or more additional measurements of a second sound pressure at a drum reference point of the ear simulator, and personalizing a first individual transfer function at low frequencies for an individual ear based on the one or more measurements of the first sound pressure, the one or more additional measurements of the second sound pressure, a fitted model, and a low shelving filter. The first individual transfer function is used to estimate sound pressure at an eardrum within an ear canal of the individual ear when at least a portion of the hearable device is within proximity of the ear canal, and, at the low frequencies, the first individual transfer function compensates for air pressure leakage resulting from a lack of coupling between the hearable device and the ear canal.

Frequency response of sound pressure at a position of a listener ("listening position") in a room is influenced by characteristics of the room (e.g., size, geometry, materials) and a position of a sound source in the room. To reproduce audio content in a room with high fidelity, speakers (e.g., loudspeakers, speakers in TVs, soundbars, etc.) need to be equalized to the room (i.e., room equalization) based on characteristics of the room and a position of the speakers in the room. Such room equalization may be performed manually or automatically with different techniques.

Similarly, hearables (e.g., on-ear headphones, over-ear headphones, in-ear earbuds, etc.) need to be equalized to each ear in order to reproduce a controlled frequency response of sound pressure at each eardrum of each ear. As the shape and size of each ear canal of each ear is different, this variance may result in different sound pressure responses for each person and each ear. Conventionally, manufacturers equalize some of their hearables based on an ideal target sound pressure response that is determined based on testing. For example, an ideal target sound pressure response may be obtained from published studies that have determined a target sound pressure response at an eardrum that is most preferred by a wide population of listeners. However, as the shape and size of each ear canal of each ear is different, a sound pressure response function at an individual eardrum of a listener may not necessarily be the same as a pre-defined ideal target sound pressure response.

As it is not possible to directly measure pressure at an eardrum of an individual due to sensitivity of the eardrum, it is not possible to directly control a sound pressure response at the eardrum. Models of ear canal transfer functions that allow an estimation of sound pressure response at an eardrum may be used, where the quality of an ear canal transfer function determines the accuracy with which a target sound pressure response at an eardrum can be achieved.

One or more embodiments provide a framework for improving estimation of an ear canal transfer function by analyzing sound pressure response inside an earbud within proximity of an ear canal (e.g., partially inserted within the ear canal), and using the transfer function to estimate sound pressure response at an eardrum within the ear canal.

FIG. 1 illustrates an example computing architecture 100 for PEQ, in one or more embodiments. In one embodiment, the computing architecture 100 comprises at least one electronic device 200 including computing resources, such as one or more processor units 210 and one or more storage units 220. One or more applications 260 may execute/operate on the electronic device 200 utilizing the computing resources of the electronic device 200.

In one embodiment, the one or more applications 260 include one or more software mobile applications loaded onto or downloaded to the electronic device 200, such as a camera application, a social media application, a video streaming application, an audio streaming application, etc.

Examples of an electronic device 200 include, but are not limited to, a television (TV) (e.g., a smart TV), a mobile electronic device (e.g., an optimal frame rate tablet, a smart phone, a laptop, etc.), a wearable device (e.g., a smart watch, a smart band, a head-mounted display, smart glasses, etc.), a desktop computer, a gaming console, a video camera, a media playback device (e.g., a DVD player), a set-top box, an Internet of things (IoT) device, a cable box, a satellite receiver, etc.

In one embodiment, an electronic device 200 comprises one or more input/output (I/O) units 230 integrated in or coupled to the electronic device 200. In one embodiment, the one or more I/O units 230 include, but are not limited to, a physical user interface (PUI) and/or a graphical user interface (GUI), such as a remote control, a keyboard, a keypad, a touch interface, a touch screen, a knob, a button, a display screen, etc. In one embodiment, a user can utilize at least one I/O unit 230 to configure one or more parameters, provide user input, etc.

In one embodiment, an electronic device 200 comprises one or more sensor units 240 integrated in or coupled to the electronic device 200. In one embodiment, the one or more sensor units 240 include, but are not limited to, a RGB color sensor, an IR sensor, an illuminance sensor, a color temperature sensor, a camera, a microphone, a GPS, a motion sensor, etc.

In one embodiment, an electronic device 200 is coupled to a hearable device 300 via a wired connection, a wireless connection such as a Bluetooth connection, a Wi-Fi connection, or a cellular data connection, or a combination of the two. Examples of a hearable device 300 include, but are not limited to, a pair of in-ear earbuds, a pair of on-ear headphones, a pair of over-ear headphones, etc.

In one embodiment, the hearable device 300 comprises a PEQ system 310 configured to perform on-device (i.e., online) PEQ of audio for playback via the hearable device 300.

In one embodiment, the hearable device 300 comprises a transducer 320 configured to convert electric signals into soundwaves that a listener wearing the hearable device 300 can hear.

In one embodiment, the hearable device 300 comprises a Near-Field (NF) microphone 330 configured to measure sound pressure at an eardrum of the listener.

In one embodiment, an electronic device 200 comprises a communications unit 250 configured to exchange data with a remote computing environment, such as a remote computing environment 110 over a communications network/connection 50 (e.g., a wireless connection such as a Wi-Fi connection or a cellular data connection, a wired connection, or a combination of the two). The communications unit 250 may comprise any suitable communications circuitry operative to connect to a communications network and to exchange communications operations and media between the electronic device 200 and other devices connected to the same communications network 50. The communications unit 250 may be operative to interface with a communications network using any suitable communications protocol such as, for example, Wi-Fi (e.g., an IEEE 802.11 protocol), Bluetooth®, high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

In one embodiment, the remote computing environment 110 includes computing resources, such as one or more servers 120 and one or more storage units 130. One or more applications 140 that provide higher-level services may execute/operate on the remote computing environment 110 utilizing the computing resources of the remote computing environment 110.

In one embodiment, the remote computing environment 110 provides an online platform for hosting one or more online services (e.g., an audio streaming service, a video streaming service, etc.) and/or distributing one or more applications. For example, an application 260 may be loaded onto or downloaded to the electronic device 110 from the remote computing environment 110 that maintains and distributes updates for the application 260. As another example, a remote computing environment 110 may comprise a cloud computing environment providing shared pools of configurable computing system resources and higher-level services.

Figure 2:
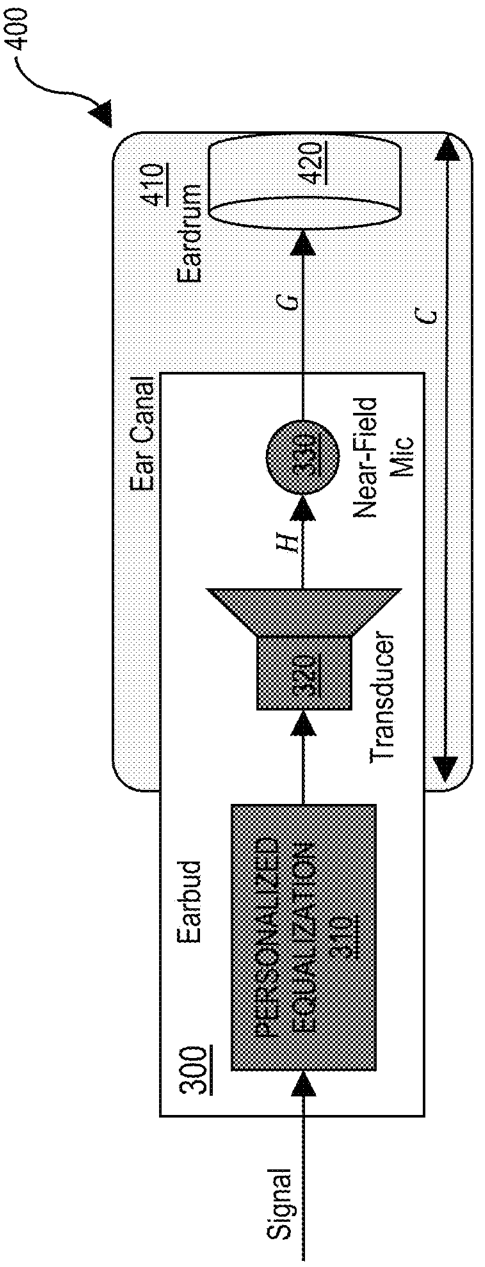
FIG. 2 illustrates an example of a portion of a hearable device inserted within an ear canal of an individual ear, in one or more embodiments.

FIG. 2 illustrates an example of a portion of a hearable device 300 inserted within an ear canal 410 of an individual ear 400, in one or more embodiments. In one embodiment, the hearable device 300 comprises a pair of in-ear earbuds 300, wherein one earbud 300 of the pair is partially inserted within the ear canal 410. The ear canal 410 extends from an eardrum 420 within the ear canal 410 to an opening through which a portion of the earbud 300 is inserted.

As shown in FIG. 2, the portion of the earbud 300 inserted plugs up the ear canal 410, creating a closed cavity. At low frequencies, sound pressure response is the same at any point inside the ear canal 410 (i.e., inside the closed cavity). At higher frequencies, however, wavelength is in the order of the length of the ear canal 410, such that sound pressure response varies at any point inside the ear canal 410. Specifically, the geometry (e.g., length, width, curvature, etc.) of the ear canal 410 determines how sound pressure response varies inside the ear canal 410, at the eardrum 420, and also near a speaker driver of the earbud 300.

A transfer function described how an input id transferred to sound pressure as a function of frequency. Let T* generally denote a pre-defined/given target sound pressure in dB (decibel)-SPL (sound pressure level). Let $SPL_{drum}$ generally denote a sound pressure response in dB-SPL at an eardrum 420, and let $SPL_{NFmic}$ generally denote a sound pressure response in dB-SPL at a microphone 330 of an earbud 300. Let C generally denote a transfer function which is decomposable into transfer functions H and G, where H is a transfer function from a speaker terminal voltage of an earbud 300 to a sound pressure response $SPL_{NFmic}$ at a microphone 330 of the earbud 300, and G is a transfer function from the sound pressure response $SPL_{NFmic}$ at the microphone 330 to a sound pressure response $SPL_{drum}$ at an eardrum 420 (i.e., $G=SPL_{drum}-SPL_{NFmic}$ in dB).

Due to geometric and physiological differences of individual ears 400, individual (i.e., personalized) transfer functions $H_I$ and $G_I$ vary for each individual ear 400. An individual transfer function $H_I$ for the individual ear 400 can be measured directly using the microphone 330 of the earbud 300. An individual transfer function $G_I$ for the individual ear 400, however, cannot be measured directly and must be estimated instead.

Conventional equalization algorithms use a generic transfer function G (i.e., fixed and not personalized) derived from a test setup that uses a test fixture (e.g., a mannequin, etc.).

One or more embodiments provide PEQ of an earbud using an individual transfer function $G_I$. Sound at an eardrum within an ear canal of an individual ear (that the earbud is within proximity of, e.g., partially inserted within the ear canal if the earbud is an in-ear earbud) is controlled based on the individual transfer function $G_I$.

In one embodiment, a parametric base transfer function $G_0$ is utilized which can be individualized by changing its parameters. An individual transfer function $G_I$ can be estimated based on the base transfer function $G_0$, where the base transfer function $G_0$ can be individualized via parameter modification.

In one embodiment, an improved estimate of an individual transfer function $G_I$ can be inferred from one or more measurements of an individual transfer function $H_I$.

Figure 3A:
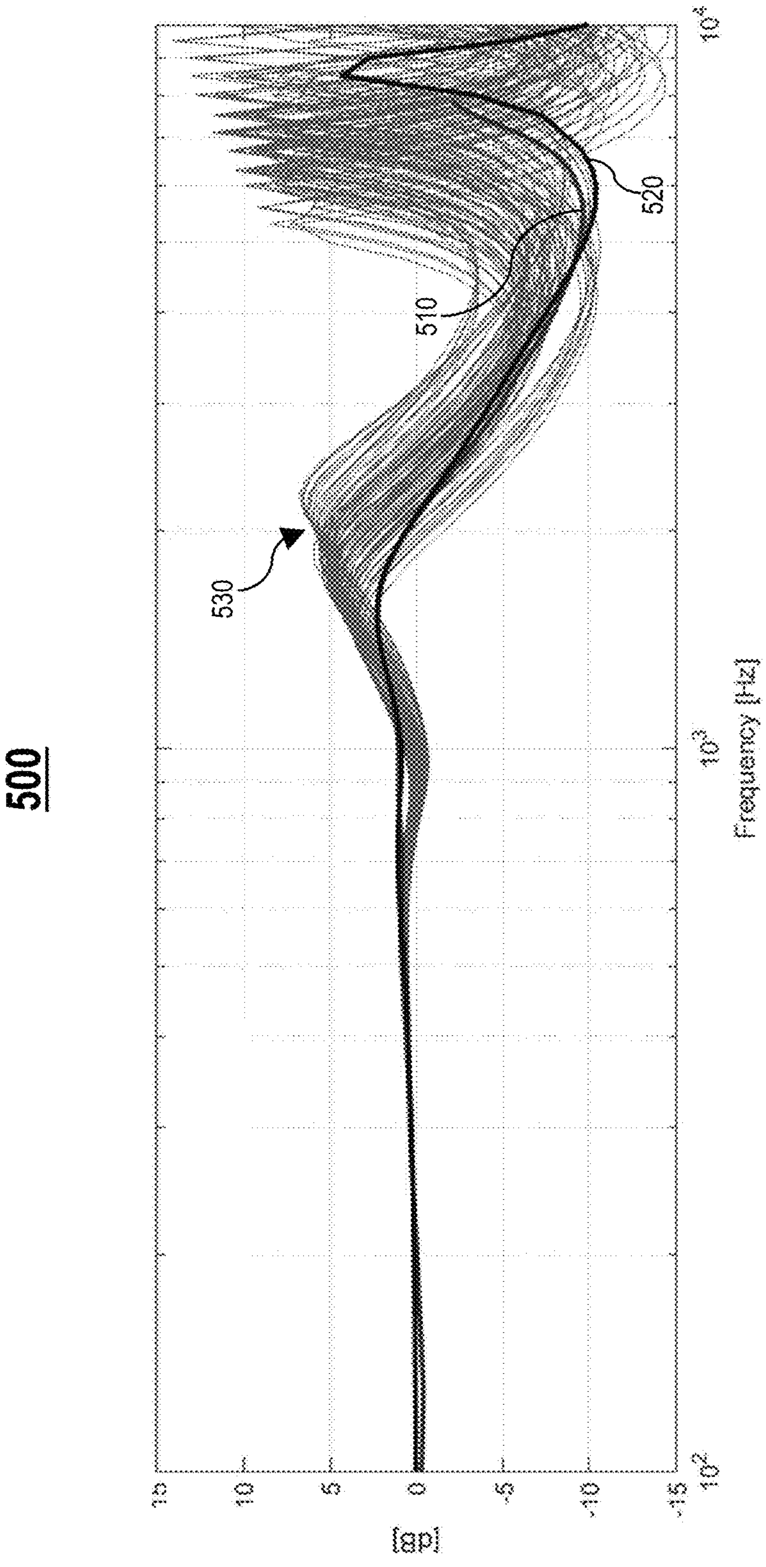
FIG. 3A illustrates an example graph plot comparing various transfer functions, in one or more embodiments.

FIG. 3A illustrates an example graph plot 500 comparing various transfer functions G, in one or more embodiments. A horizontal axis of the graph plot 500 represents frequency expressed in Hertz (Hz). A vertical axis of the graph plot 500 represents sound pressure amplitude expressed in dB. As shown in FIG. 3A, the graph plot 500 includes: (1) a first curve 510 representing a measured transfer function $G_{measured}$ obtained using an industry standard test fixture, such as a head and torso simulator, (2) a second curve 520 representing a simulated transfer function $G_{simulated}$ obtained using the same industry standard test fixture, and (3) a set 530 of curves representing a plurality of individual transfer functions $G_I$ obtained using finite element simulations of a plurality of different ears (e.g., 20 different ears) and a plurality of different earbud positions (e.g., 5 different earbud positions) in each ear.

Based on the graph plot 500, the PEQ system 310 takes into account the following observations regarding an individual transfer function $G_I$: (1) an individual transfer function $G_I$ varies with different ear geometries and insert positions, but generally follows the shape/trend of the measured/simulated transfer function $G_{measured}/G_{simulated}$, (2) at low frequencies, there is no variance among individual transfer functions $G_I$, (3) around 800 Hz to 4000 Hz, variance among individual transfer functions $G_I$ starts to increase, but the shape/trend of the individual transfer functions $G_I$ is well defined with broad peaks and dips, (4) above 4000 Hz, variance among individual transfer functions $G_I$ becomes very large and intractable, (5) between 1200 Hz and 2400 Hz, peaks of individual transfer functions $G_I$ appear to line up along a line, and (6) at 1800 Hz, variance among individual transfer functions $G_I$ reach 3 dB (95% confidence interval).

Figure 3B:
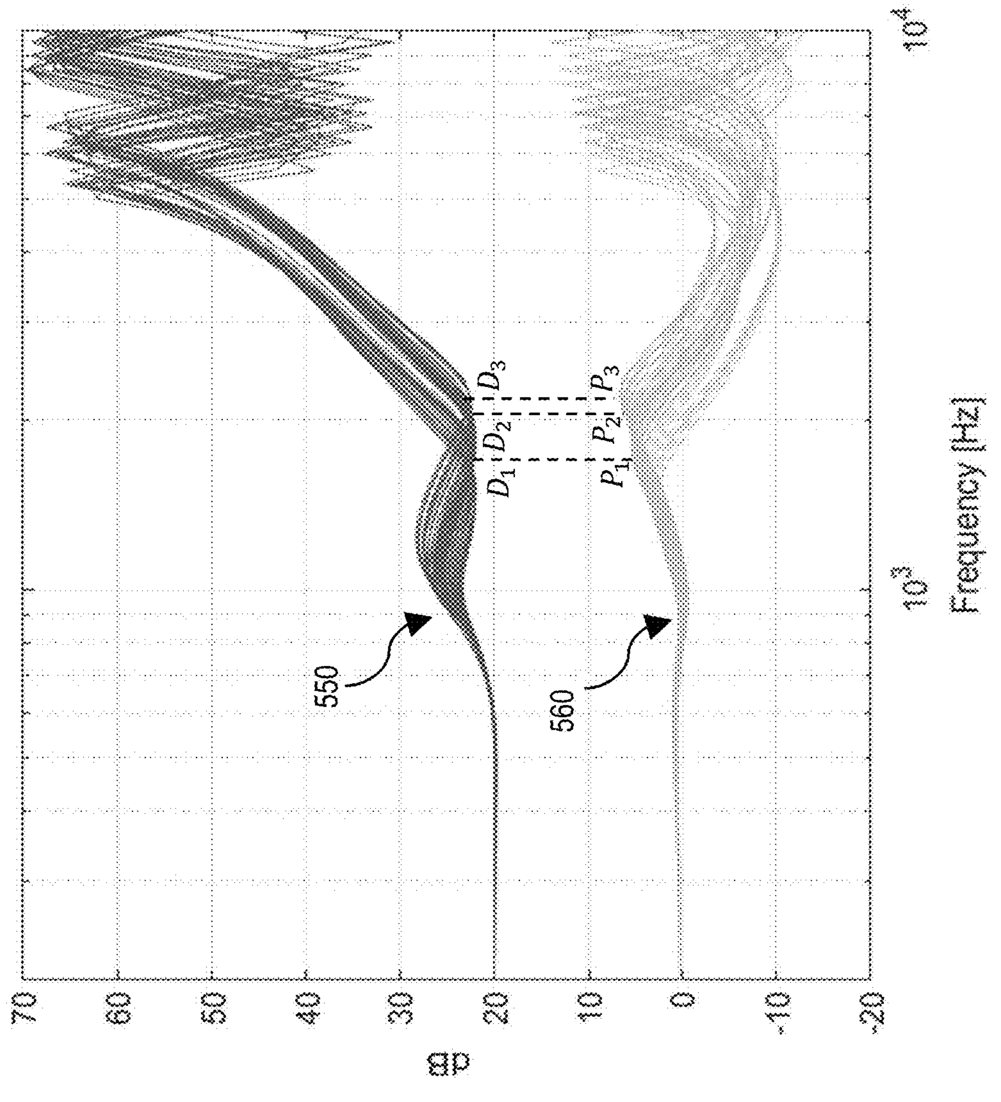
FIG. 3B illustrates an example graph plot comparing different individual transfer functions, in one or more embodiments.

FIG. 3B illustrates an example graph plot 540 comparing different individual transfer functions $H_I$ and $G_I$, in one or more embodiments. A horizontal axis of the graph plot 540 represents frequency expressed in Hz. A vertical axis of the graph plot 540 represents sound pressure expressed in dB-SPL. As shown in FIG. 3B, the graph plot 540 includes: (1) a first set 550 of curves representing a plurality of individual transfer functions $H_I$ obtained using finite element simulations of a plurality of different ears (e.g., 20 different ears) and a plurality of different earbud positions (e.g., 5 different earbud positions) in each ear, and (2) a second set 560 of curves representing a plurality of individual transfer functions $G_I$ obtained using the same finite element simulations. For visualization purposes, the first set 550 of curves are offset by 20 dB.

Based on the graph plot 540, the PEQ system 310 takes into account the following observation regarding an individual transfer function $G_I$ for a particular ear: below 4000 Hz, an individual transfer function $G_I$ for a particular ear can be inferred from an individual transfer function $H_I$ for the same particular ear. For example, as shown in FIG. 3B, the frequencies at which peaks (e.g., $P_1$, $P_2$, $P_3$, etc.) of the individual transfer functions $G_I$ occur are at the same frequencies at which the individual transfer functions $H_I$ exhibit dips (e.g., $D_1$, $D_2$, $D_3$, etc.). Therefore, a peak gain $G_{peak}$ in dB of an individual transfer function $G_I$ appears to grow linearly with frequency f.

Figure 3C:
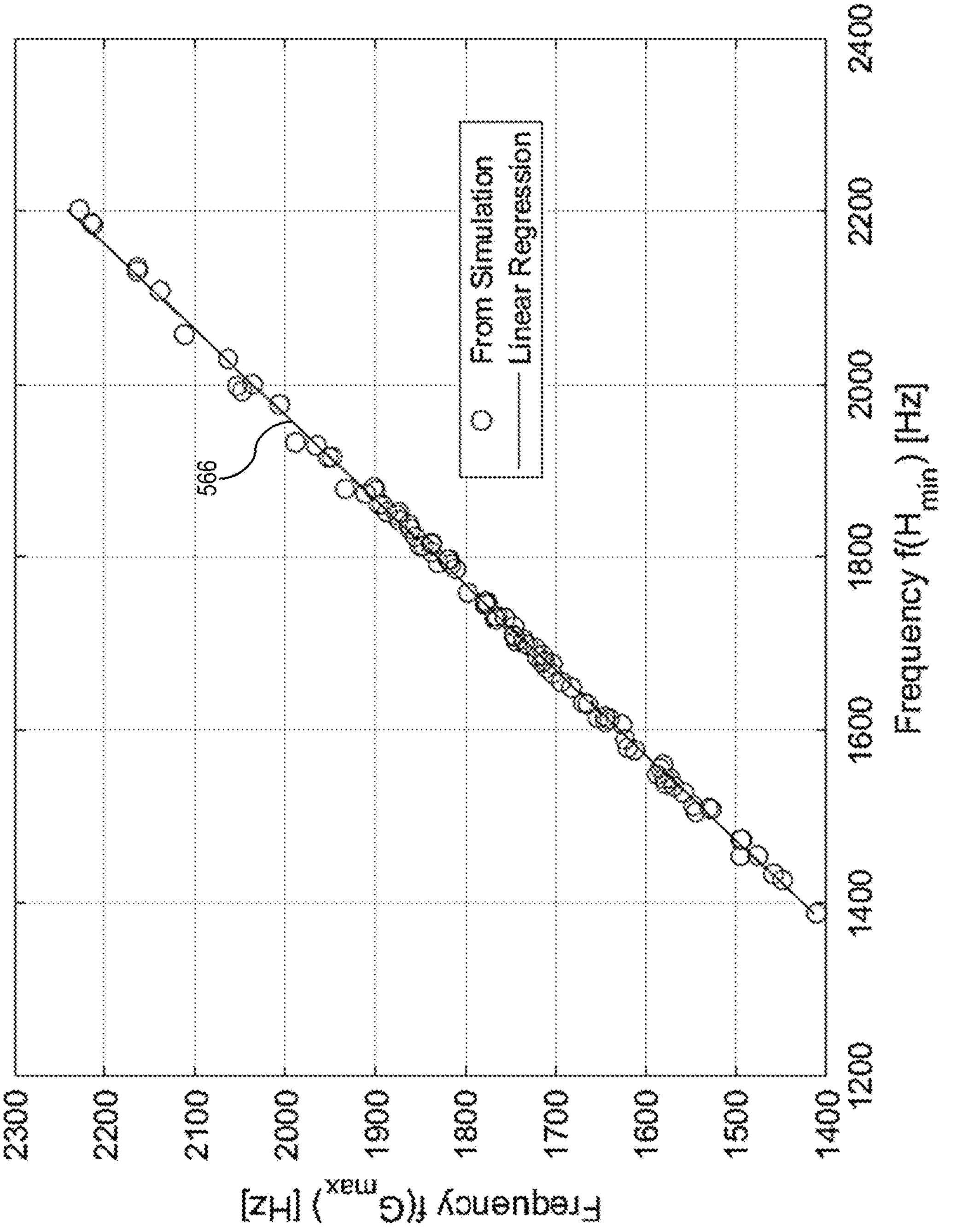
FIG. 3C illustrates an example graph plot of a linear function describing a direct relationship between a frequency of a maximum gain of an individual transfer function and a frequency of a minimum gain of an individual transfer function, in one or more embodiments.

FIG. 3C illustrates an example graph plot 565 of a linear function 566 describing a direct relationship between a frequency $f(G_{max})$ of a maximum gain $G_{max}$ of an individual transfer function $G_I$ and a frequency $f(H_{min})$ of a minimum gain $H_{min}$ of an individual transfer function $H_I$, in one or more embodiments. A horizontal axis of the graph plot 565 represents frequency $f(H_{min})$ expressed in Hz of dips of the individual transfer functions $H_I$ in FIG. 3B. A vertical axis of the graph plot 565 represents frequency $f(G_{max})$ expressed in Hz of peaks of the individual transfer functions $G_I$ in FIG. 3B. As shown in FIG. 3C, the frequency $f(G_{max})$ appears to grow linearly with the frequency $f(H_{min})$.

Figure 3D:
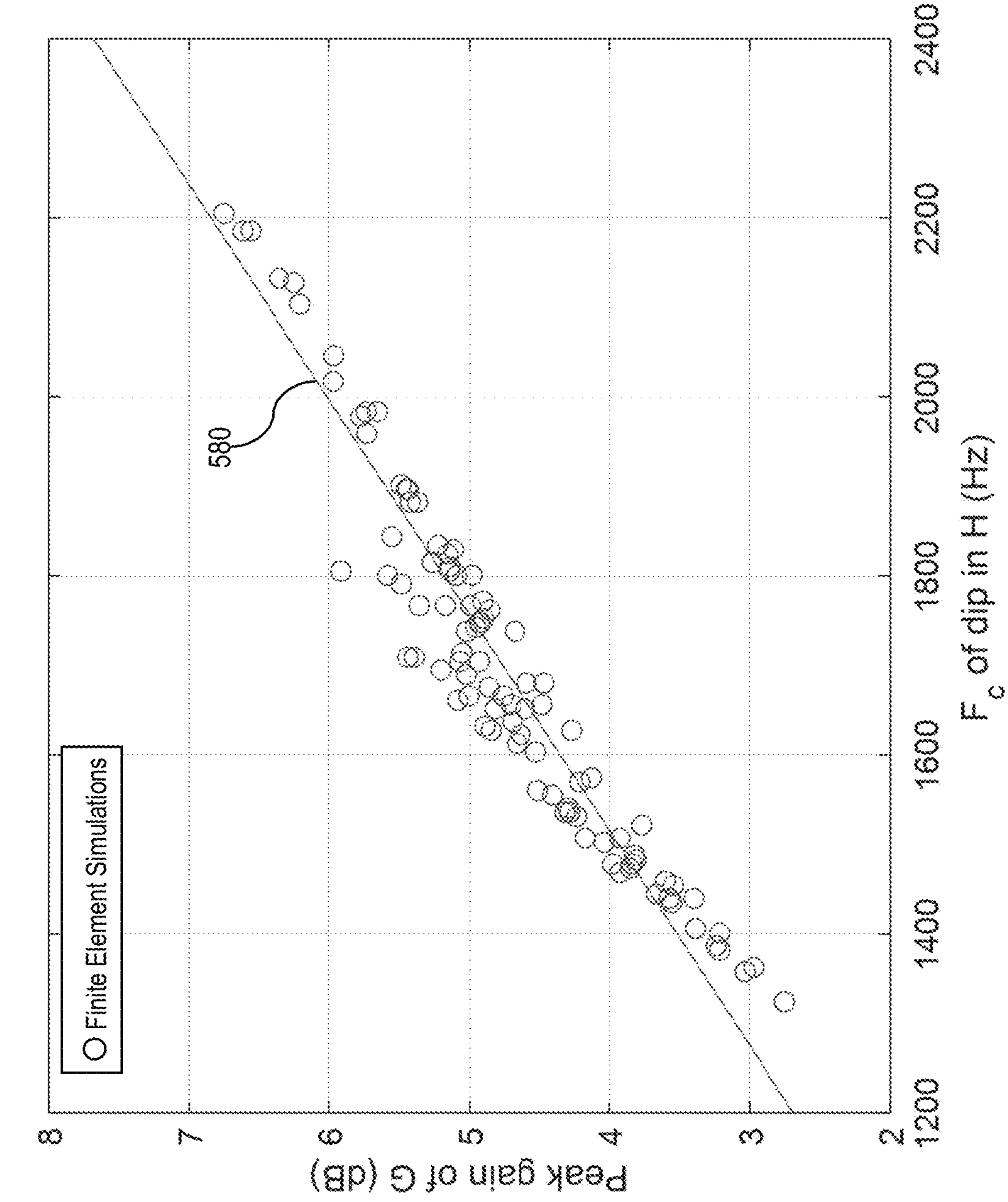
FIG. 3D illustrates an example graph plot of a linear function describing a direct relationship between a peak gain of an individual transfer function and a center frequency of a local minima in the gain of the pressure at a microphone of a hearable device partially inserted within an ear canal of an individual ear, in one or more embodiments.

FIG. 3D illustrates an example graph plot 570 of a linear function 580 describing a direct relationship between a peak gain $G_{peak}$ of an individual transfer function $G_I$ and a center frequency $f_c$ of a local minima in the gain of the pressure at a microphone of a hearable device partially inserted within an ear canal of an individual ear, in one or more embodiments. A horizontal axis of the graph plot 570 represents center frequency $f_c$ expressed in Hz of dips of the individual transfer functions $H_I$ in FIG. 3B. A vertical axis of the graph plot 570 represents peak gain $G_{peak}$ expressed in dB of the individual transfer functions $G_I$ in FIG. 3B. As shown in FIG. 3D, the peak gain $G_{peak}$ appears to grow linearly with the center frequency $f_c$.

In one embodiment, the linear function 580 may be represented in accordance with equation (1) provided below:

$$G_{peak} = -2.3 + 0.042 * f. \quad (1)$$

One or more embodiments provide an improvement over using a generic transfer function G derived from a test setup that uses a test fixture.

Figure 4:
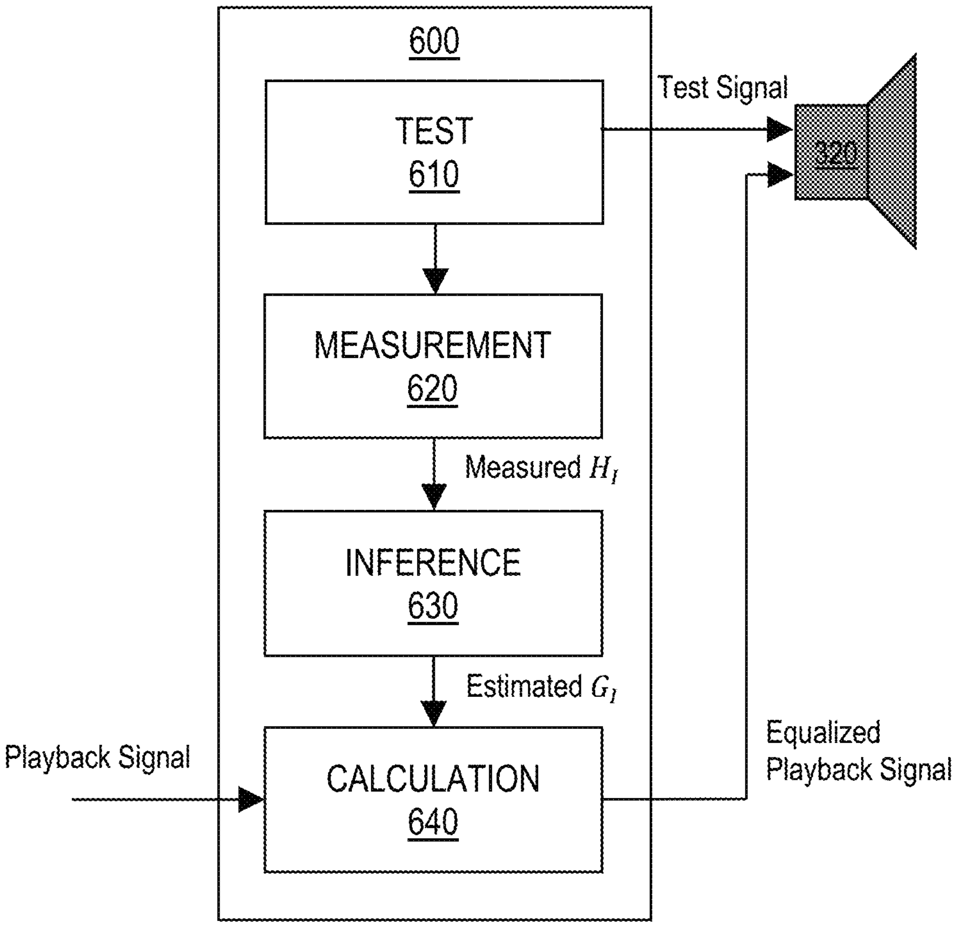
FIG. 4 illustrates an example PEQ system, in one or more embodiments.

FIG. 4 illustrates an example PEQ system 600, in one or more embodiments. In one embodiment, the PEQ system 310 in FIGS. 1-2 is implemented as the PEQ system 600. In one embodiment the PEQ system 600 comprises a test unit 610, a measurement unit 620, an inference unit 630, and a calculation unit 640.

In one embodiment, the test unit 610 is configured to: (1) detect an insertion of an earbud 300 (that the system 600 is integrated in) into an ear canal 410 of an individual ear 400, and (2) in response to the insertion, deliver an audio test signal to a transducer 320 of the earbud 300 for playback inside the individual ear 400, wherein the audio test signal represents a test tone or a sample of music. In one embodiment, the audio test signal is pre-programmed into a memory of the earbud 300. In another embodiment, the audio test signal is obtained from an electronic device 200. In yet another embodiment, the audio test signal is content chosen by a listener/user (e.g., music, speech, etc.) for audio playback.

In one embodiment, the measurement unit 620 is configured to trigger a microphone 330 of the earbud 300 to directly obtain one or more measurements of an individual transfer function $H_I$ for an individual ear 400, wherein the one or more measurements capture one or more sound pressure responses $SPL_{NFmic}$ at the microphone 330 during playback of an audio test signal inside the individual ear 400. In one embodiment, the one or more measurements are iteratively obtained.

In one embodiment, the inference unit 630 is configured to: (1) receive one or more measurements of an individual transfer function H for an individual ear 400 (e.g., from the measurement unit 620), and (2) based on the one or more measurements, estimate (i.e., derive/infer) an individual transfer function $G_I$ for the individual ear 400. In one embodiment, an individual transfer function $G_I$ is estimated using machine learning or general regression techniques. In one embodiment, an individual transfer function $G_I$ is iteratively estimated.

In one embodiment, the inference unit 630 individualizes/personalizes a transfer function G for an individual ear 400 (i.e., estimates an individual transfer function $G_I$) using a parametric base transfer function $G_0$ with one or more parameters adjusted/individualized ("individualized parameters") for the individual ear 400. For example, in one embodiment, the base transfer function $G_0$ is constructed from a combination of four biquads (i.e., second-order filters), wherein each biquad k is defined by a center frequency $$f_c^k,$$

a gain, and Q, and $k \in [1,4]$.

The inference unit 630 estimates (i.e., derives/infers) one or more individualized parameters for an individual ear 400 (i.e., parameter modification) based on one or more measurements of an individual transfer function $H_I$ for the individual ear 400. Specifically, in one embodiment, a transfer function G for the individual ear 400 is individualized/personalized by adjusting both a center frequency $$f_c^k$$

and a gain of a biquad k. For example, a center frequency $$f_c^2$$

of the second biquad is adjusted/set to the frequency at which the measured individual transfer function $H_I$ has a minimum, and a gain of the second biquad is adjusted/set to the gain value at the center frequency $$f_c^2,$$

resulting in an individual transfer function $G_I$ for the individual ear 400 that is equal to a peak gain $G_{peak}$ at the center frequency $$f_c^2.$$

In another embodiment, a transfer function G for the individual ear 400 is individualized/personalized by adjusting only a center frequency $$f_c^k$$

of a biquad k (e.g., adjusting only a center frequency $$f_c^2$$

of the second biquad).

In another embodiment, a transfer function G for the individual ear 400 is individualized/personalized by adjusting only $G_{peak}$.

In one embodiment, the calculation unit 640 is configured to: (1) obtain a pre-defined/given target sound pressure response T* (e.g., pre-programmed into a memory of the earbud 300 or obtained from an electronic device 200), (2) receive one or more measurements of an individual transfer function $H_I$ for an individual ear 400 (e.g., from the measurement unit 620 or the inference unit 630), (3) receive an estimated individual transfer function $G_I$ for the individual ear 400 (e.g., from the inference unit 630), and (4) calculate a PEQ value PEQ for the individual ear 400 based on the target sound pressure response T*, the one or more measurements of the individual transfer function $H_I$, and the estimated individual transfer function $G_I$. In one embodiment, the calculation unit 640 calculates the PEQ value PEQ using units of dB, in accordance with equation (2) provided below:

$$PEQ = T^* - H_I - G_I. \tag{2}$$

In one embodiment, the calculation unit 640 is further configured to: (1) receive an audio playback signal for playback inside the individual ear 400 (e.g., from an electronic device 200), (2) apply the PEQ value PEQ within the audio full range (low, mid and high frequencies) to the audio playback signal, and (3) deliver the resulting equalized audio playback signal to the transducer 320 for playback inside the individual ear 400.

Figure 5A:
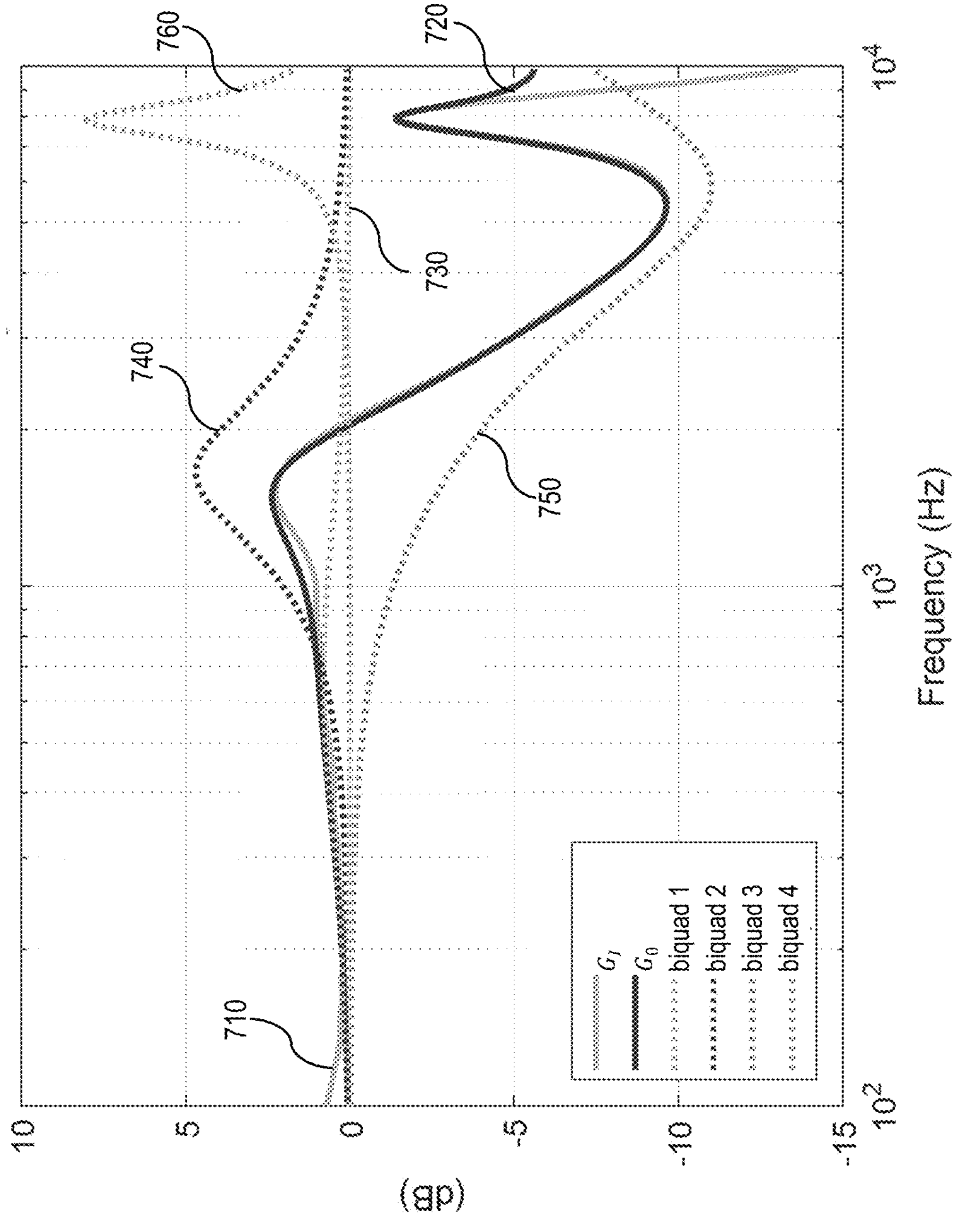
FIG. 5A illustrates an example graph plot of various transfer functions, in one or more embodiments.

FIG. 5A illustrates an example graph plot 700 of various transfer functions G, in one or more embodiments. A horizontal axis of the graph plot 700 represents frequency expressed in Hz. A vertical axis of the graph plot 700 represents sound pressure expressed in dB. As shown in FIG. 5A, the graph plot 700 includes: (1) a first curve 710 representing an individual transfer function $G_I$ estimated via the inference unit 630 using a parametric base transfer function $G_0$ and one or more individualized parameters, (2) a second curve 720 representing the base transfer function $G_0$, (3) a third curve 730 representing a first biquad of the base transfer function $G_0$, (4) a fourth curve 740 representing a second biquad of the base transfer function $G_0$, (5) a fifth curve 750 representing a third biquad of the base transfer function $G_0$, and (6) a sixth curve 760 representing a fourth biquad of the base transfer function $G_0$.

Figure 5B:
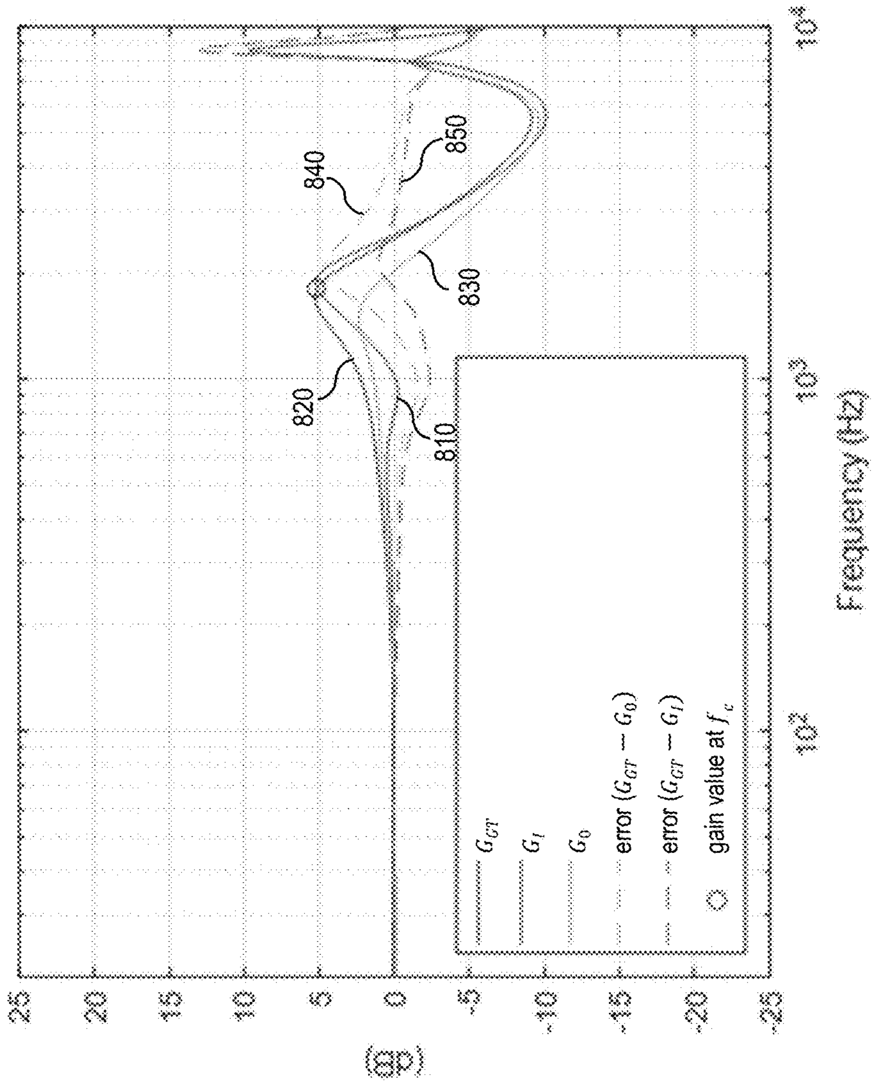
FIG. 5B illustrates another example graph plot of various transfer functions and errors between some of the transfer functions, in one or more embodiments.

FIG. 5B illustrates another example graph plot 800 of various transfer functions G and errors between some of the transfer functions G, in one or more embodiments. A horizontal axis of the graph plot 800 represents frequency expressed in Hz. A vertical axis of the graph plot 800 represents sound pressure expressed in dB. As shown in FIG. 5B, the graph plot 800 includes: (1) a first curve 810 representing a ground truth transfer function $G_{GT}$ obtained using finite element simulations, (2) a second curve 820 representing an individual transfer function $G_I$ estimated via the inference unit 630 using a parametric base transfer function $G_0$ and one or more individualized parameters, (3) a third curve 830 representing the base transfer function $G_0$, (3) a fourth curve 840 representing an error between the ground truth transfer function $G_{GT}$ and the base transfer function $G_0$, and (5) a fifth curve 850 representing an error between the ground truth transfer function $G_{GT}$ and the individual transfer function $G_I$.

Figure 5C:
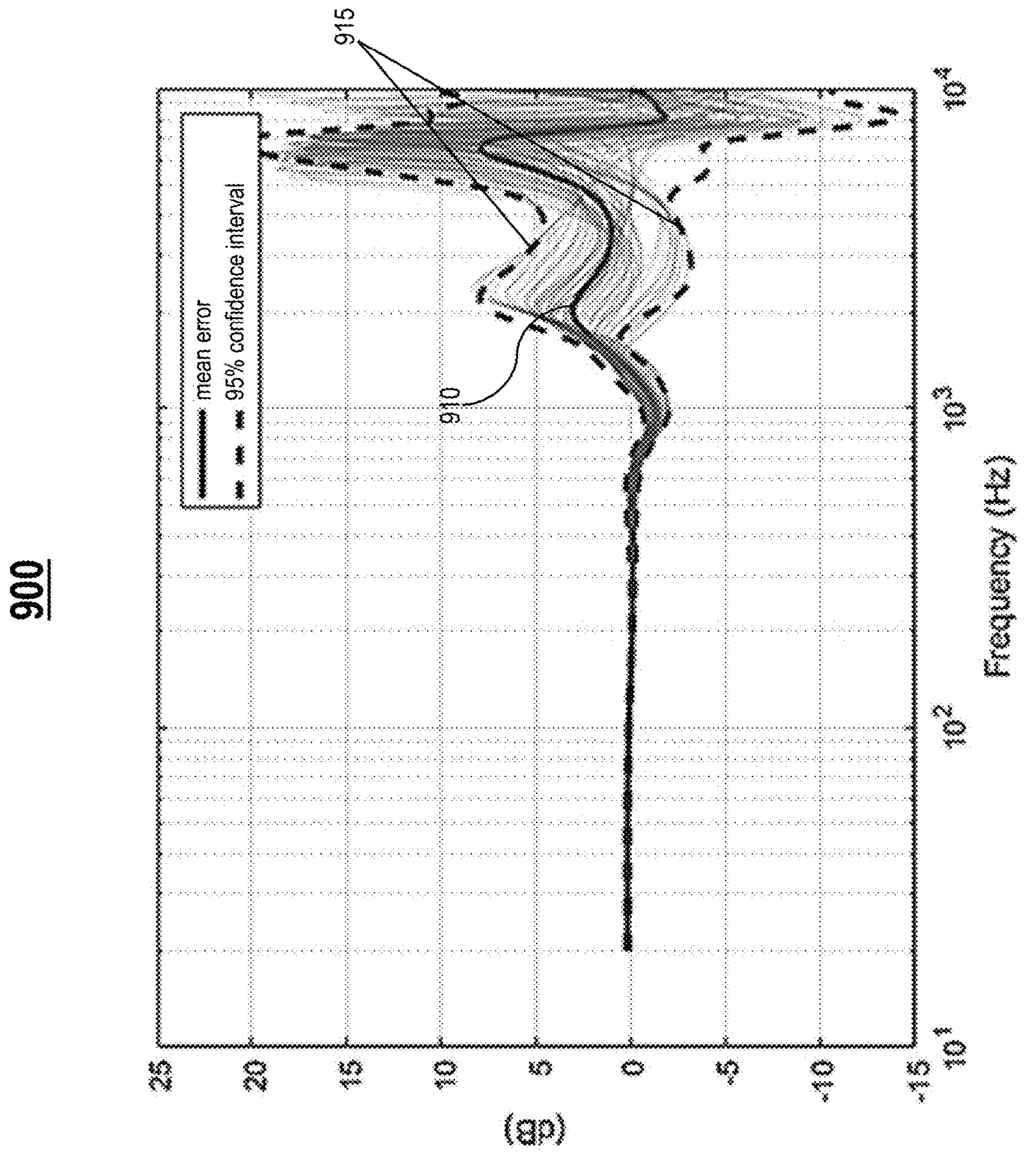
FIG. 5C illustrates an example graph plot of an error between a ground truth transfer function and a parametric base transfer function, in one or more embodiments.

FIG. 5C illustrates an example graph plot 900 of an error between a ground truth transfer function $G_{GT}$ and a parametric base transfer function $G_0$, in one or more embodiments. A horizontal axis of the graph plot 900 represents frequency expressed in Hz. A vertical axis of the graph plot 900 represents sound pressure expressed in dB. As shown in FIG. 5C, the graph plot 900 includes: (1) a first curve 910 representing a mean error between the ground truth transfer function $G_{GT}$ and the base transfer function $G_0$, and (2) a 95% confidence interval 915 delineated by upper and lower bounds.

Figure 5D:
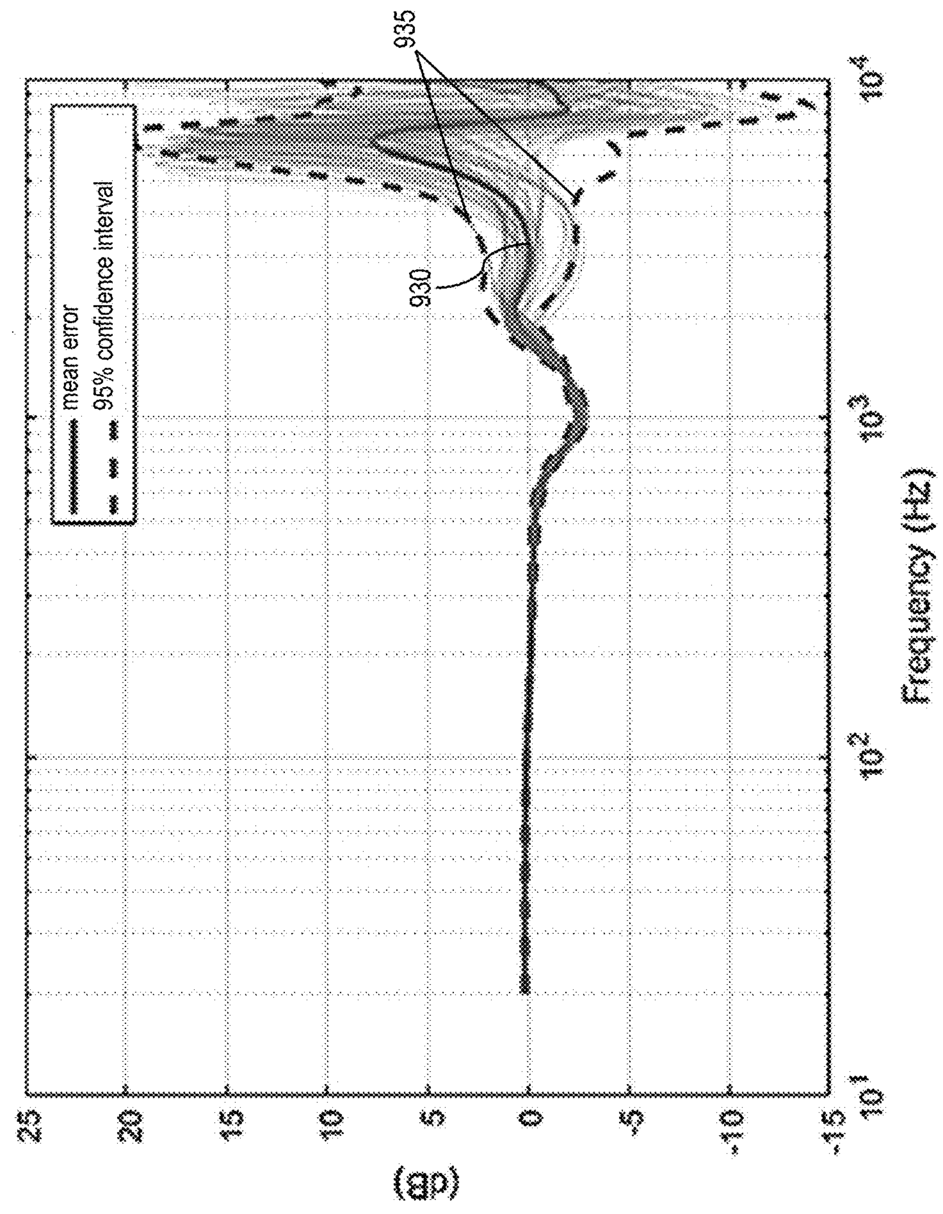
FIG. 5D illustrates an example graph plot of an error between a ground truth transfer function and a first individual transfer function, in one or more embodiments.

FIG. 5D illustrates an example graph plot 920 of an error between a ground truth transfer function $G_{GT}$ and a first individual transfer function $G_I$, in one or more embodiments. A horizontal axis of the graph plot 920 represents frequency expressed in Hz. A vertical axis of the graph plot 920 represents sound pressure expressed in dB. The first individual transfer function $G_I$ is estimated via the inference unit 630 which adjusts both $$f_c^2$$

and $G_{peak}$. As shown in FIG. 5D, the graph plot 920 includes: (1) a first curve 930 representing a mean error between the ground truth transfer function $G_{GT}$ and the first individual transfer function $G_I$, and (2) a 95% confidence interval 935 delineated by upper and lower bounds.

As shown in the graph plots 900 and 920, at frequencies below 4000 Hz, adjusting both $$f_c^2$$

and $G_{peak}$ greatly reduces the variance of error compared to just using the base transfer function $G_0$, and also reduces mean error between 1.5 kHz and 4 kHz frequencies.

Figure 5E:
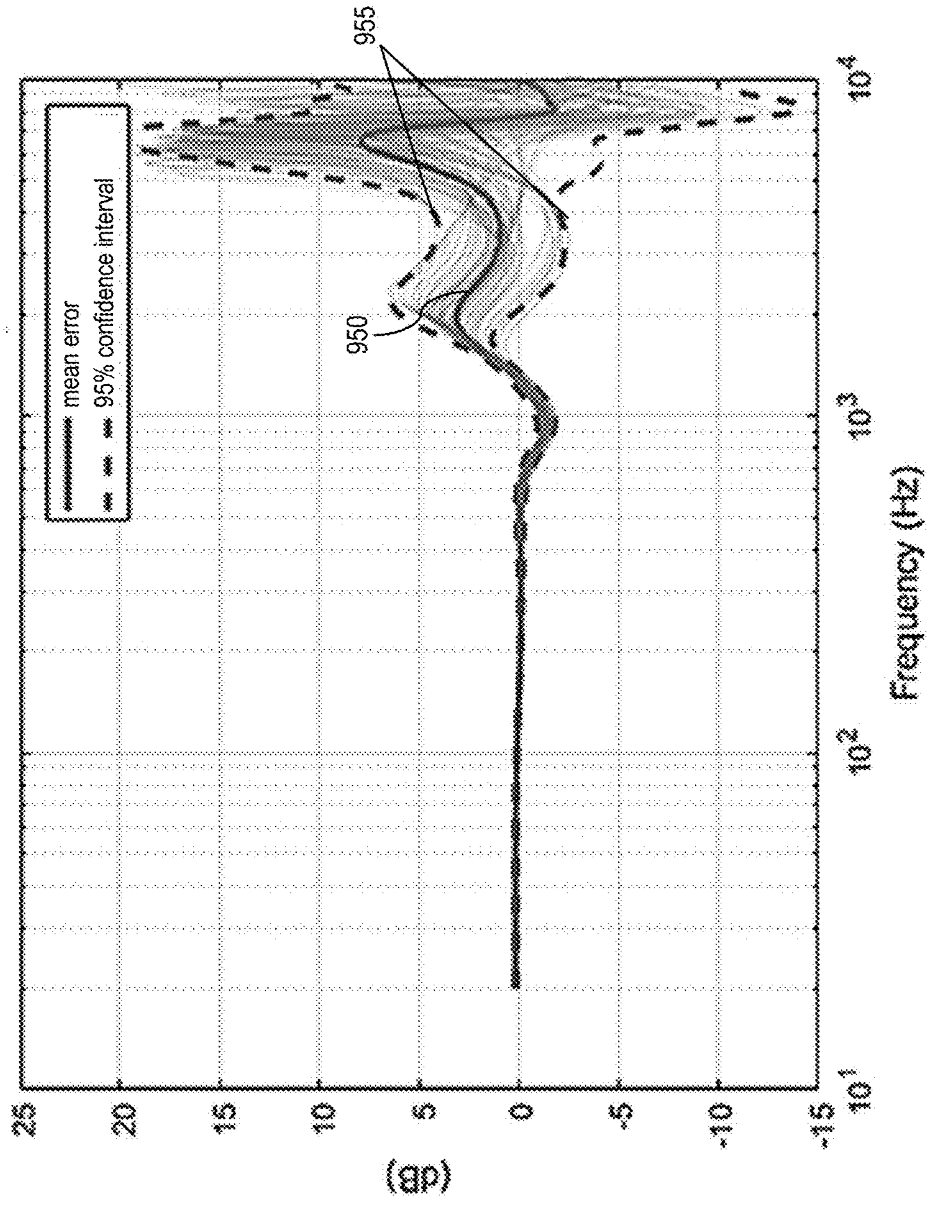
FIG. 5E illustrates another example graph plot of an error between a ground truth transfer function and a second individual transfer function, in one or more embodiments.

FIG. 5E illustrates another example graph plot 940 of an error between a ground truth transfer function $G_{GT}$ and a second individual transfer function $G_I$, in one or more embodiments. A horizontal axis of the graph plot 940 represents frequency expressed in Hz. A vertical axis of the graph plot 940 represents sound pressure expressed in dB. The second individual transfer function $G_I$ is estimated via the inference unit 630 which adjusts only $$f_c^2.$$

As shown in FIG. 5E, the graph plot 940 includes: (1) a first curve 950 representing a mean error between the ground truth transfer function $G_{GT}$ and the second individual transfer function $G_I$, and (2) a 95% confidence interval 955 delineated by upper and lower bounds.

As shown in the graph plots 900 and 940, at frequencies below 4000 Hz, adjusting only $$f_c^2$$

greatly reduces the variance of error compared to just using the base transfer function $G_0$, however the mean error appears to remain unchanged.

Figure 5F:
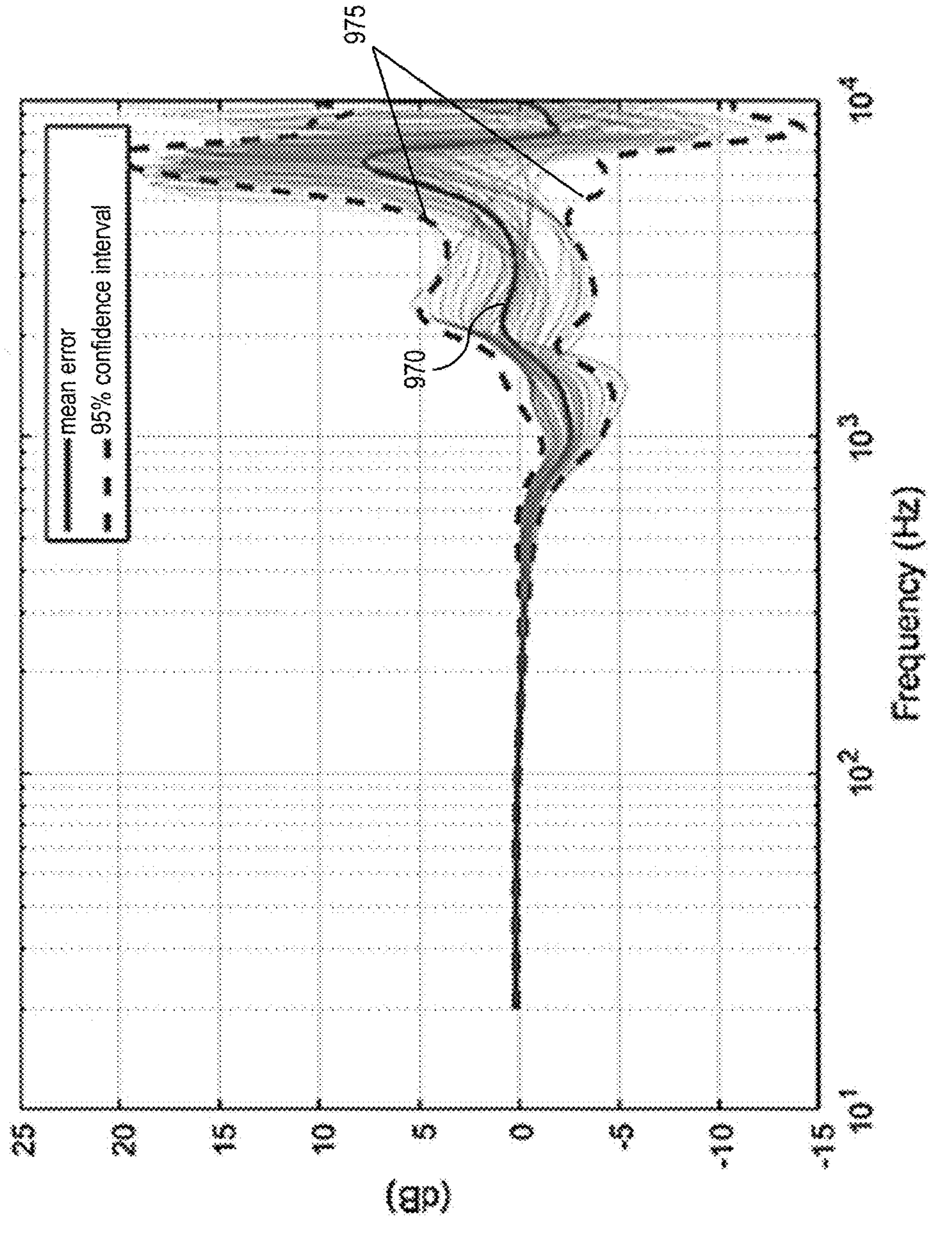
FIG. 5F illustrates another example graph plot of an error between a ground truth transfer function and a third individual transfer function, in one or more embodiments.

FIG. 5F illustrates another example graph plot 960 of an error between a ground truth transfer function $G_{GT}$ and a third individual transfer function $G_I$, in one or more embodiments. A horizontal axis of the graph plot 960 represents frequency expressed in Hz. A vertical axis of the graph plot 960 represents sound pressure expressed in dB. The third individual transfer function $G_I$ is estimated via the inference unit 630 which adjusts only $G_{peak}$. As shown in FIG. 5F, the graph plot 960 includes: (1) a first curve 970 representing a mean error between the ground truth transfer function $G_{GT}$ and the third individual transfer function $G_I$, and (2) a 95% confidence interval 975 delineated by upper and lower bounds.

As shown in the graph plots 900 and 960, at frequencies below 4000 Hz, adjusting only $G_{peak}$ reduces the mean error compared to just using the base transfer function $G_0$, however the variance of error is not significantly reduced.

Let NFM generally denote a NF microphone 330 of an earbud 300, let ERP generally denote an ear reference point of a head and torso simulator, and let DRP generally denote a drum reference point of the head and torso simulator. Let $H_{NFM}$ generally denote a transfer function H for the NFM, and let $H_{DRP}$ generally denote a transfer function H for the DRP. Let $G_{HATS}$ generally denote an average frequency response of 14 inserts ($H_{DRP}$–$H_{NFM}$) of an earbud 300 measured using the head and torso simulator (HATS).

$G_{HATS}$ is used in PEQ to estimate sound pressure at an eardrum 420 within an ear canal 410. At low frequencies, $G_{HATS}$ tends to zero assuming the wavelengths at these frequencies are very long, so that the ear canal 410 acts as a pressure chamber, resulting in sound pressure at the NFM and sound pressure at the DRP having the same frequency response.

Figure 6A:
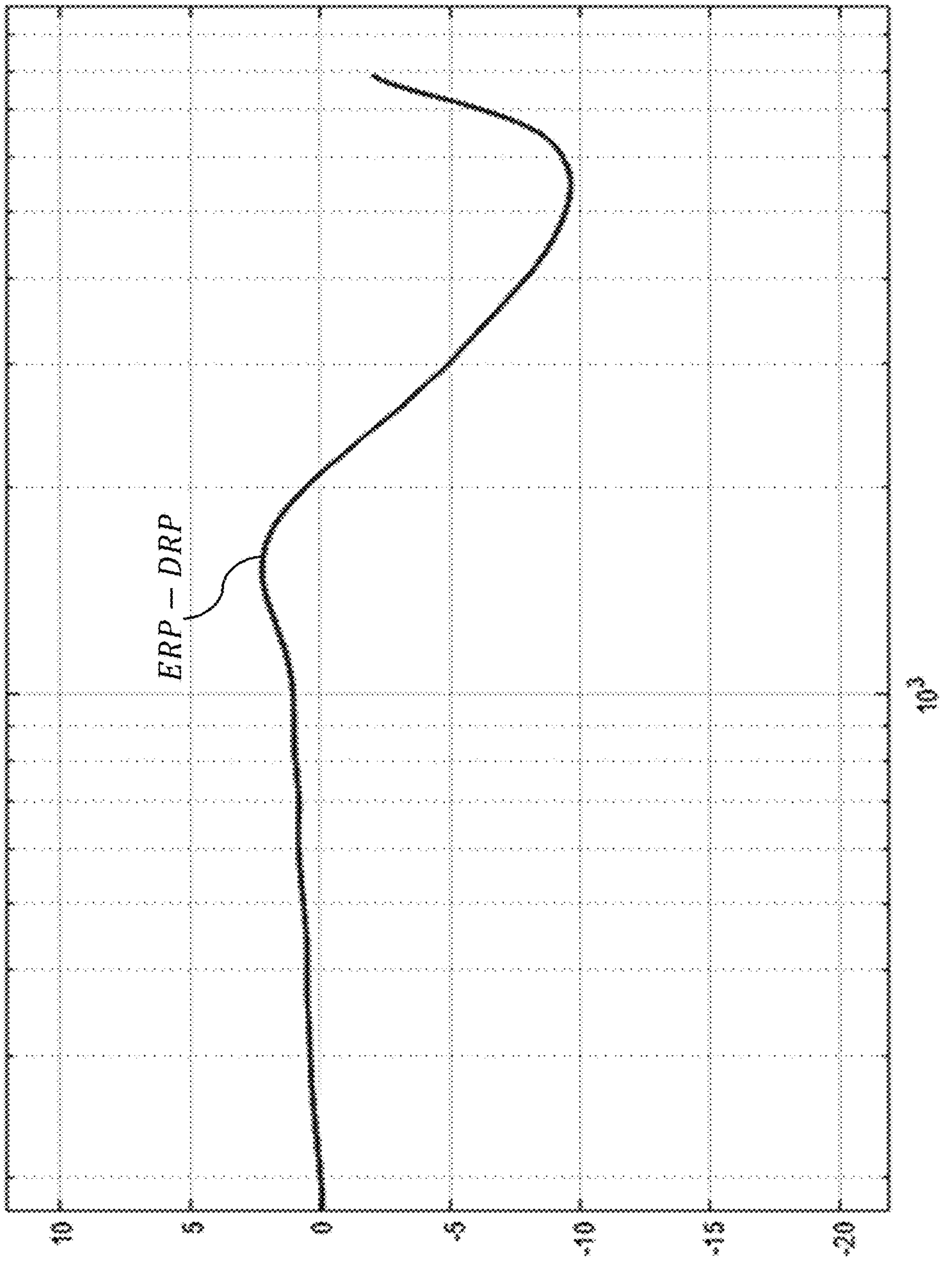
FIG. 6A illustrates an example graph plot of ERP-DRP in PEQ, in one or more embodiments.

FIG. 6A illustrates an example graph plot 1000 of ERP-DRP in PEQ, in one or more embodiments. A horizontal axis of the graph plot 1000 represents frequency expressed in Hz. A vertical axis of the graph plot 1000 represents sound pressure difference expressed in dB. The graph plot 1000 includes a first curve representing ERP-DRP, i.e., difference between sound pressure at the ERP and sound pressure at the DRP.

Figure 6B:
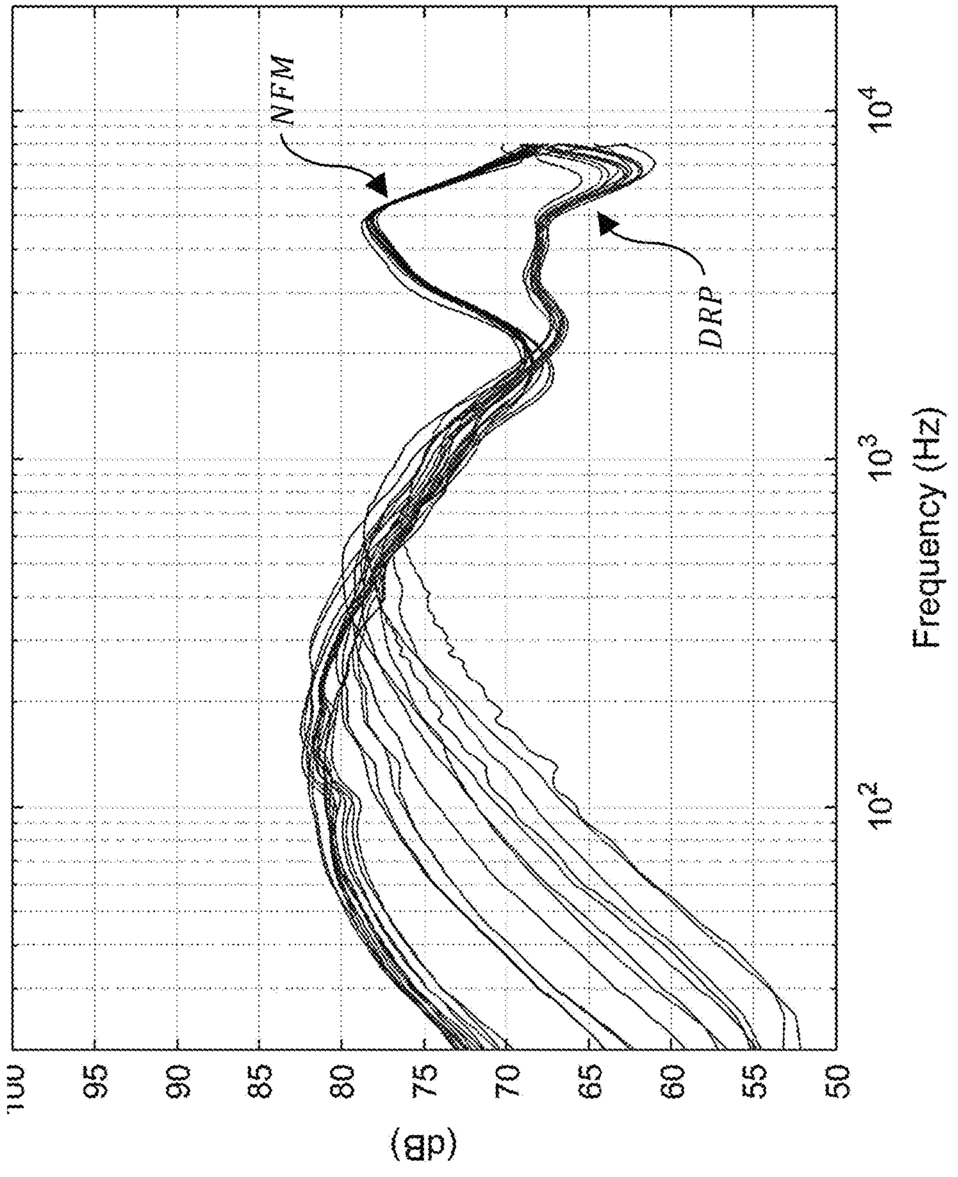
FIG. 6B illustrates an example graph plot of measurements for 14 inserts of an earbud that are measured using a head and torso simulator, in one or more embodiments.

FIG. 6B illustrates an example graph plot 1010 of measurements for 14 inserts of an earbud 300 that are measured using a head and torso simulator, in one or more embodiments. A horizontal axis of the graph plot 1010 represents frequency expressed in Hz. A vertical axis of the graph plot 1010 represents sound pressure expressed in dB. The graph plot 1010 includes: (1) a first set of curves ("NFM") representing sound pressure at the NFM for the 14 inserts, and (2) a second set of curves ("DRP") representing sound pressure at the DRP for the 14 inserts.

Air pressure leakage (or air leakage) may occur when there is insufficient coupling between an earbud 300 and an ear canal 410/a head and torso simulator the earbud 300 is positioned within proximity of. As shown in FIG. 6B, in some measurements where there is excessive air pressure leakage at low frequencies, sound pressure at the DRP is lower than sound pressure at the NFM—this results in an underestimation of sound pressure at the DRP and an insufficient level of air pressure leakage compensation at low frequencies when applying PEQ.

Figure 6C:
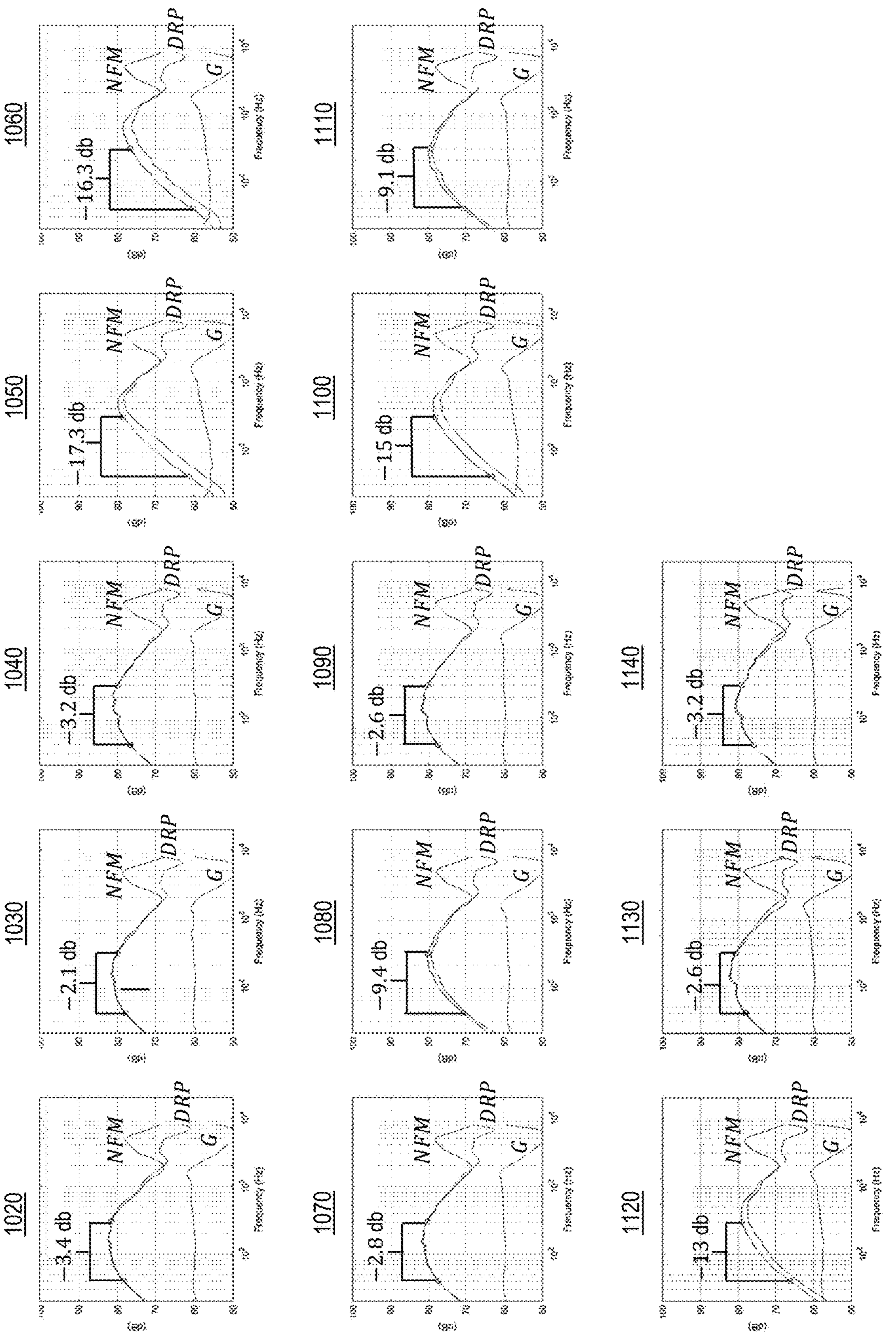
FIG. 6C illustrates example graph plots of measurements for 13 of the 14 inserts, in one or more embodiments.

FIG. 6C illustrates example graph plots 1020-1140 of measurements for 13 of the 14 inserts, in one or more embodiments. A horizontal axis of each graph plot 1020-1140 represents frequency expressed in Hz. A vertical axis of each graph plot 1020-1140 represents sound pressure expressed in dB. Each graph plot 1020-1140 corresponds to one of the 13 inserts, and includes: (1) a first curve ("NFM") representing sound pressure at the NFM for the corresponding insert, (2) a second curve ("DRP") representing sound pressure at the DRP for the corresponding insert, and (3) a third curve ("G") representing a measured individual transfer function G (i.e., G=DRP-NFM) for the corresponding insert.

Each graph plot 1020-1140 further indicates a leak ratio (i.e., an amount of air pressure leakage due to insufficient coupling) for a corresponding insert, wherein the leak ratio is based on a NFM ratio for the corresponding insert between 40 Hz and 300 Hz. For example, the graph plot 1020 corresponding to a first insert indicates a leak ratio of −3.4 dB, the graph plot 1030 corresponding to a second insert indicates a leak ratio of −2.1 dB, the graph plot 1040 corresponding to a third insert indicates a leak ratio of −3.2 dB, the graph plot 1050 corresponding to a fourth insert indicates a leak ratio of −17.3 dB, the graph plot 1060 corresponding to a fifth insert indicates a leak ratio of −16.3 dB, the graph plot 1070 corresponding to a sixth insert indicates a leak ratio of −2.8 dB, the graph plot 1080 corresponding to a seventh insert indicates a leak ratio of −9.4 dB, the graph plot 1090 corresponding to an eighth insert indicates a leak ratio of −2.6 dB, the graph plot 1100 corresponding to a ninth insert indicates a leak ratio of −15 dB, the graph plot 1110 corresponding to a tenth insert indicates a leak ratio of −9.1 dB, the graph plot 1120 corresponding to an eleventh insert indicates a leak ratio of −13 dB, the graph plot 1130 corresponding to a twelfth insert indicates a leak ratio of −2.6 dB, and the graph plot 1140 corresponding to a thirteenth insert indicates a leak ratio of −3.2 dB.

Estimation of sound pressure at an eardrum 420 may be determined using DRP-ERP. Specifically, a measured individual transfer function G at low frequencies may be determined in accordance with equation (3) provided below:

$$G = DRP - ERP. \tag{3}$$

Figure 6D:
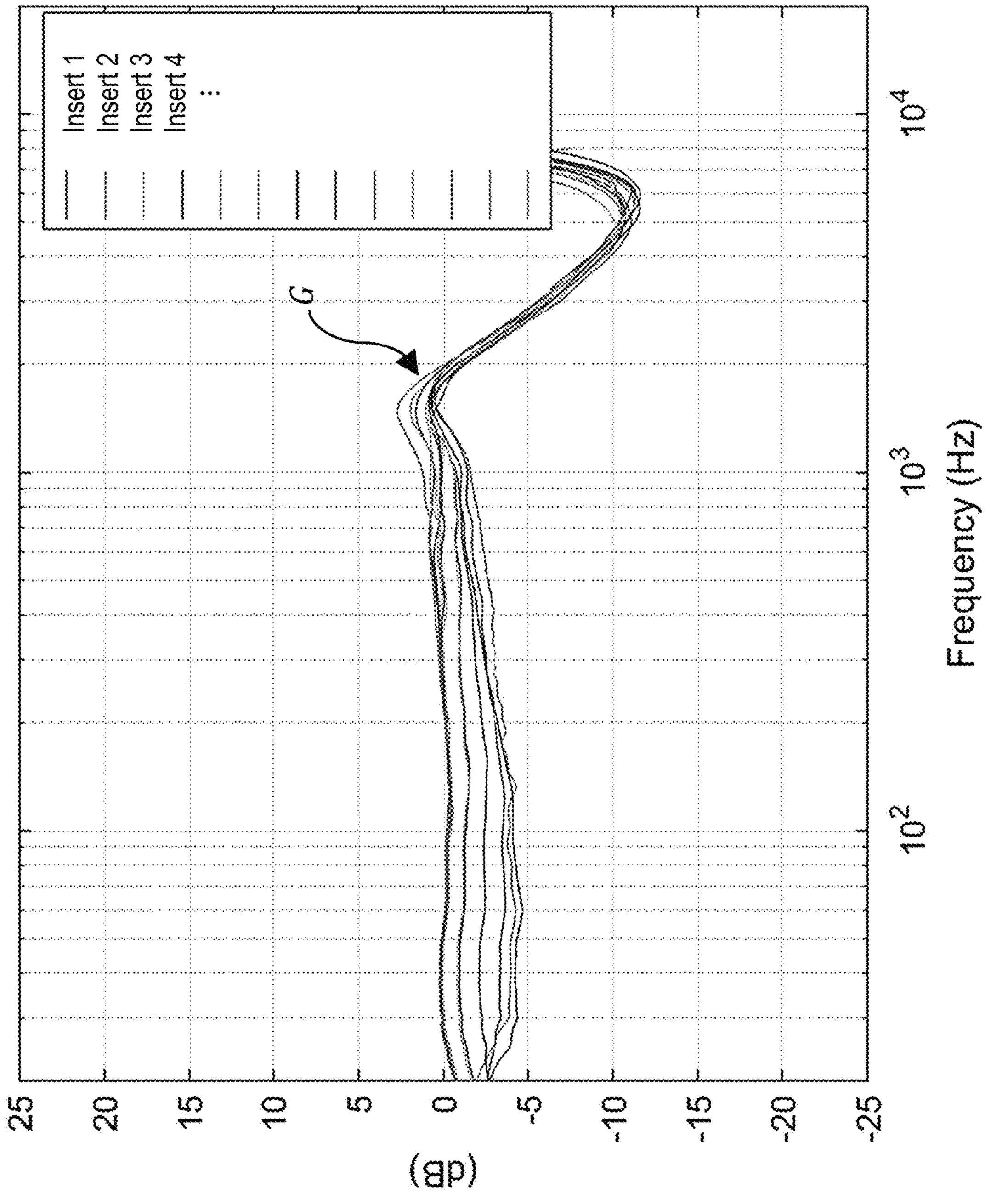
FIG. 6D illustrates an example graph plot of measured individual transfer functions G for the 13 inserts, in one or more embodiments.

FIG. 6D illustrates an example graph plot 1150 of measured individual transfer functions G for the 13 inserts, in one or more embodiments. A horizontal axis of the graph plot 1150 represents frequency expressed in Hz. A vertical axis of the graph plot 1150 represents sound pressure difference expressed in dB. The graph plot 1150 includes a first set of curves ("G") representing measured individual transfer functions G (i.e., G=DRP−ERP) for the 13 inserts. As shown in FIG. 6D, at low frequencies, some of the measured individual transfer functions G show air pressure leakage due to insufficient coupling.

Let GLF gain generally denote a gain in a measured individual transfer function G at low frequencies. At low frequencies, the gain GLF gain relates to an underestimation in the measured individual transfer function G to predict sound pressure at the DRP. Table 1 below provides, for each of the measured individual transfer functions G in FIG. 6D, a corresponding average level of GLF gain in dB in the frequency range of 40 Hz to 100 Hz.

TABLE 1

| GLF gain (in units of dB) |
|---|
| −0.0204 |
| −0.0042 |
| −0.1236 |
| −4.3649 |
| −4.0310 |
| −0.0831 |
| −1.1236 |
| −0.0751 |
| −3.5158 |
| −1.0193 |
| −2.2900 |
| −0.0130 |
| −0.1751 |

Figure 6E:
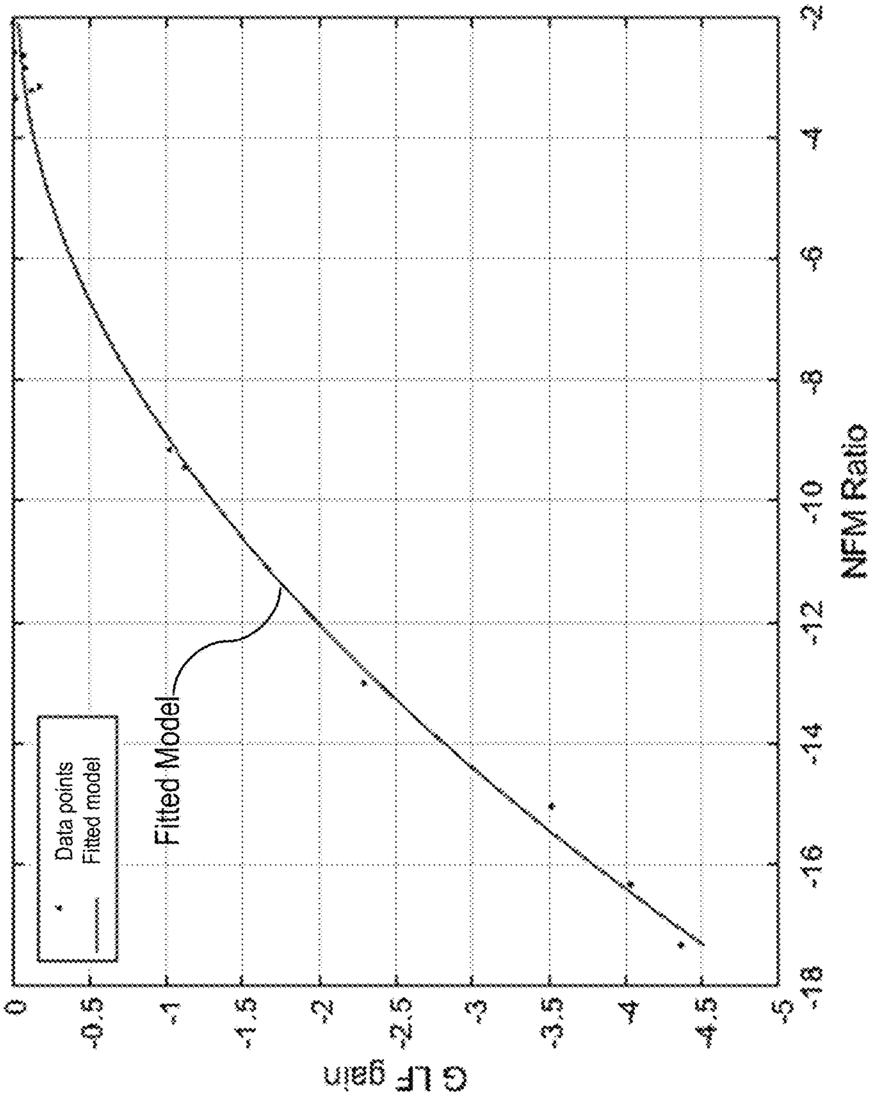
FIG. 6E illustrates an example graph plot of a fitted model, in one or more embodiments.

FIG. 6E illustrates an example graph plot 1160 of a fitted model, in one or more embodiments. A horizontal axis of the graph plot 1160 represents NFM ratio between 40 Hz and 300 Hz. A vertical axis of the graph plot 1160 represents GLF gain expressed in dB in the frequency range of 40 Hz to 100 Hz. The graph plot 1160 includes a fitted quadratic polynomial curve ("fitted model") that fits data points representing the average levels of GLF gain in Table 1 provided above.

For example, in one embodiment, the fitted model is represented in accordance with equation (4) provided below:

$$val(x) = p_1 * x^2 + p_2 * x + p_3, \tag{4}$$

wherein $p_1$, $p_2$, and $p_3$ are coefficients with 95% confidence bounds as follows: $p_1$=−0.01823 (−0.02161,−0.01485), $p_2$=−0.06016 (−0.1233, 0.002995), and $p_3$=−0.08705 (−0.2867, 0.1126).

In one embodiment, the PEQ system 600 is configured for individualization of an individual transfer function G at low frequencies (e.g., via the inference unit 630). In one embodiment, the PEQ system 600 adapts an individual transfer function G at low frequencies using the fitted model by applying a low shelving filter LSHV to $G_{HATS}$. A gain g of the low shelving filter LSHV corresponds to a gain GLF gain in a measured individual transfer function G (i.e., G=DRP-NFM). An optimal center frequency $f_c$ and an optimal Q of the low shelving filter LSHV are determined using non-linear optimization in which the sum of root mean square (RMS) errors between an estimated DRP and an actual DRP is minimized. For example, in one embodiment, $f_c$=1493.3 Hz, Q=0.2457, and [b, a]=biquad ($f_c$, Q, g, $f_s$, LSHV), wherein $f_s$ is a sampling frequency of the low shelving filter LSHV.

For example, in one embodiment, the PEQ system 600 determines an individual transfer function $G_{new}$ at low frequencies in accordance with equations (5)-(7) provided below:

$$G_{new} = G_{HATS} + LSHV, \tag{5}$$

$$H_{DRPnew} = H_{NFM} + G_{new}, \text{ and} \tag{6}$$

$$e = \sum \sqrt{\frac{1}{n} \sum_i (H_{DRPnew} - H_{DRP})_i^2}, \tag{7}$$

wherein n is 14 inserts, and i is frequency bins 30 Hz to 2000 Hz.

By using the fitted model and the low shelving filter LSHV, a transfer function G can be personalized to allow more precise prediction of sound pressure at low frequencies even on bad inserts with a high amount of air pressure leakage, thereby providing air pressure leakage compensation.

Figure 6F:
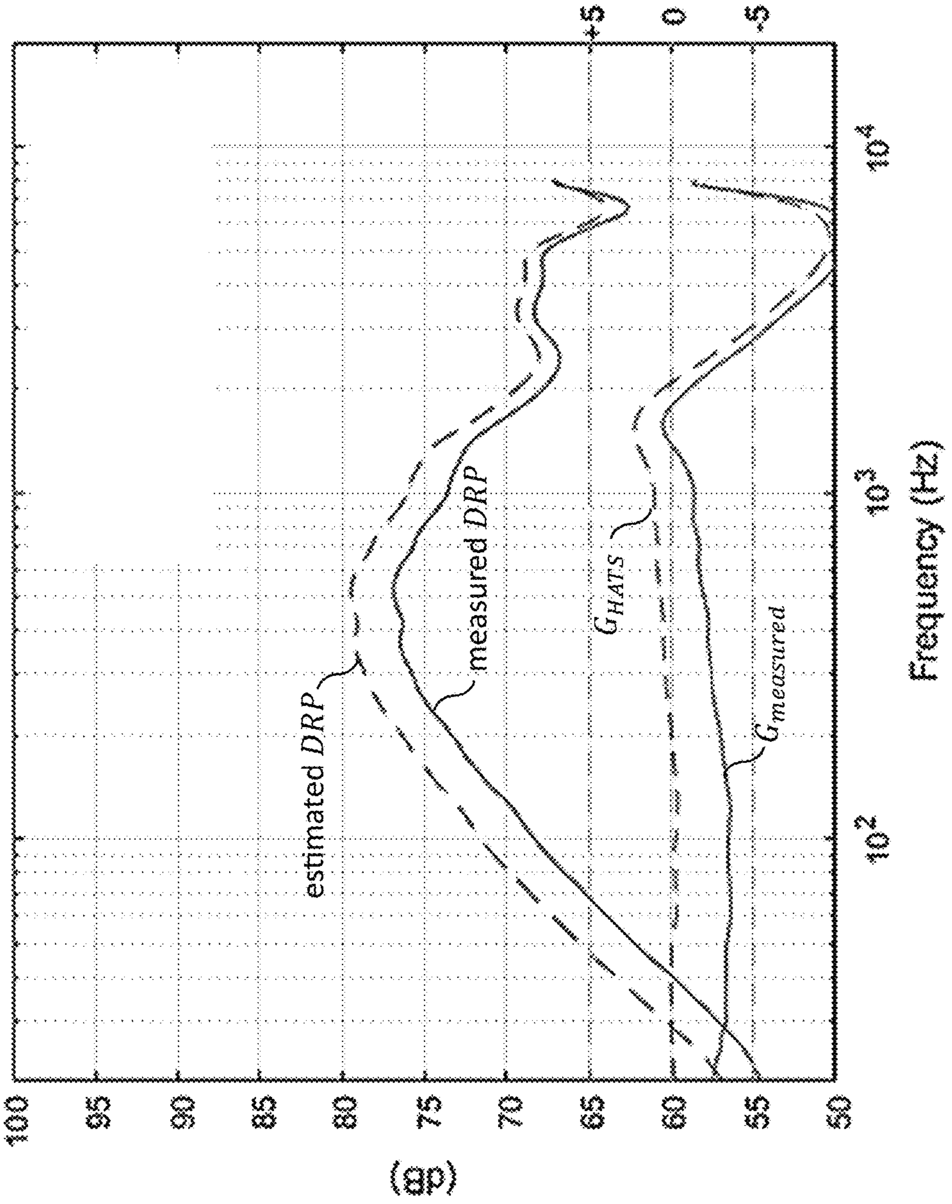
FIG. 6F illustrates an example graph plot of an estimated DRP using $G_{HATS}$, in one or more embodiments.

FIG. 6F illustrates example graph plot 1170 of an estimated DRP using $G_{HATS}$, in one or more embodiments. A horizontal axis of the graph plot 1170 represents frequency expressed in Hz. A vertical axis of the graph plot 1170 represents sound pressure expressed in dB. The graph plot 1170 includes: (1) a first curve ("$G_{HATS}$") representing $G_{HATS}$, (2) a second curve ("estimated DRP") representing an estimated sound pressure at the DRP using $G_{HATS}$, (3) a third curve ("$G_{measured}$") representing an individual transfer function $G_{measured}$ that is measured, and (4) a fourth curve ("measured DRP") representing a sound pressure at the DRP that is measured using $G_{measured}$. Estimating sound pressure at the DRP using $G_{HATS}$ produces a wrong estimation of sound pressure at an eardrum 420, resulting in an insufficient level of air pressure leakage compensation at low frequencies when applying PEQ.

Figure 6G:
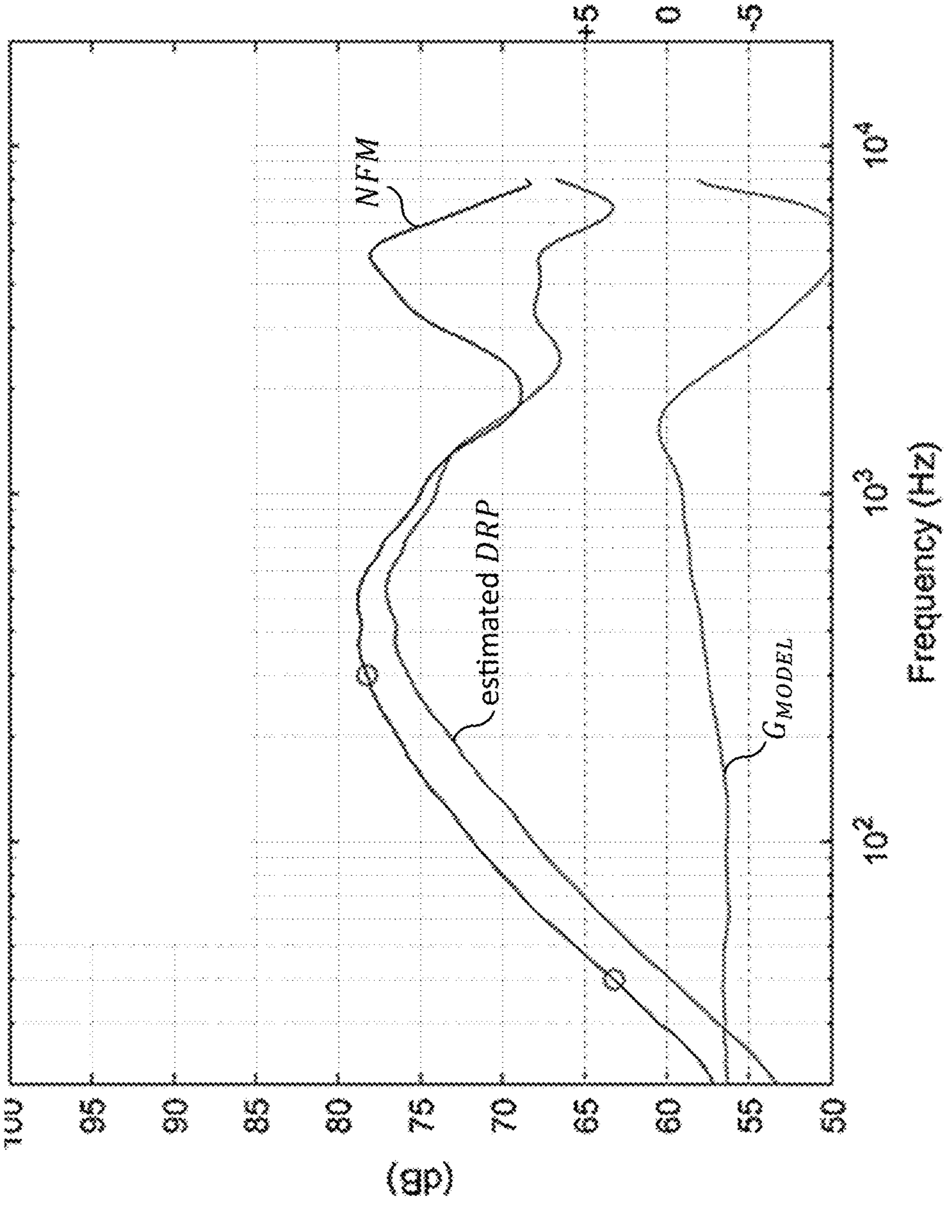
FIG. 6G illustrates an example graph plot of an estimated DRP using $G_{MODEL}$, in one or more embodiments.

FIG. 6G illustrates example graph plot 1180 of an estimated DRP using $G_{MODEL}$, in one or more embodiments. A horizontal axis of the graph plot 1180 represents frequency expressed in Hz. A vertical axis of the graph plot 1180 represents sound pressure expressed in dB. The graph plot 1180 includes: (1) a first curve ("NFM") representing sound pressure at the NFM, (2) a second curve ("estimated DRP") representing an estimated sound pressure at the DRP using $G_{MODEL}$, and (3) a third curve ("$G_{MODEL}$") representing a modeled individual transfer function $G_{MODEL}$, wherein $G_{MODEL}$=DRP-NFM.

Compared to using $G_{HATS}$, estimating sound pressure at the DRP using $G_{MODEL}$ produces a much better estimation of sound pressure at an eardrum 420, resulting in a good level of air pressure leakage compensation at low frequencies when applying PEQ.

Figure 6H:
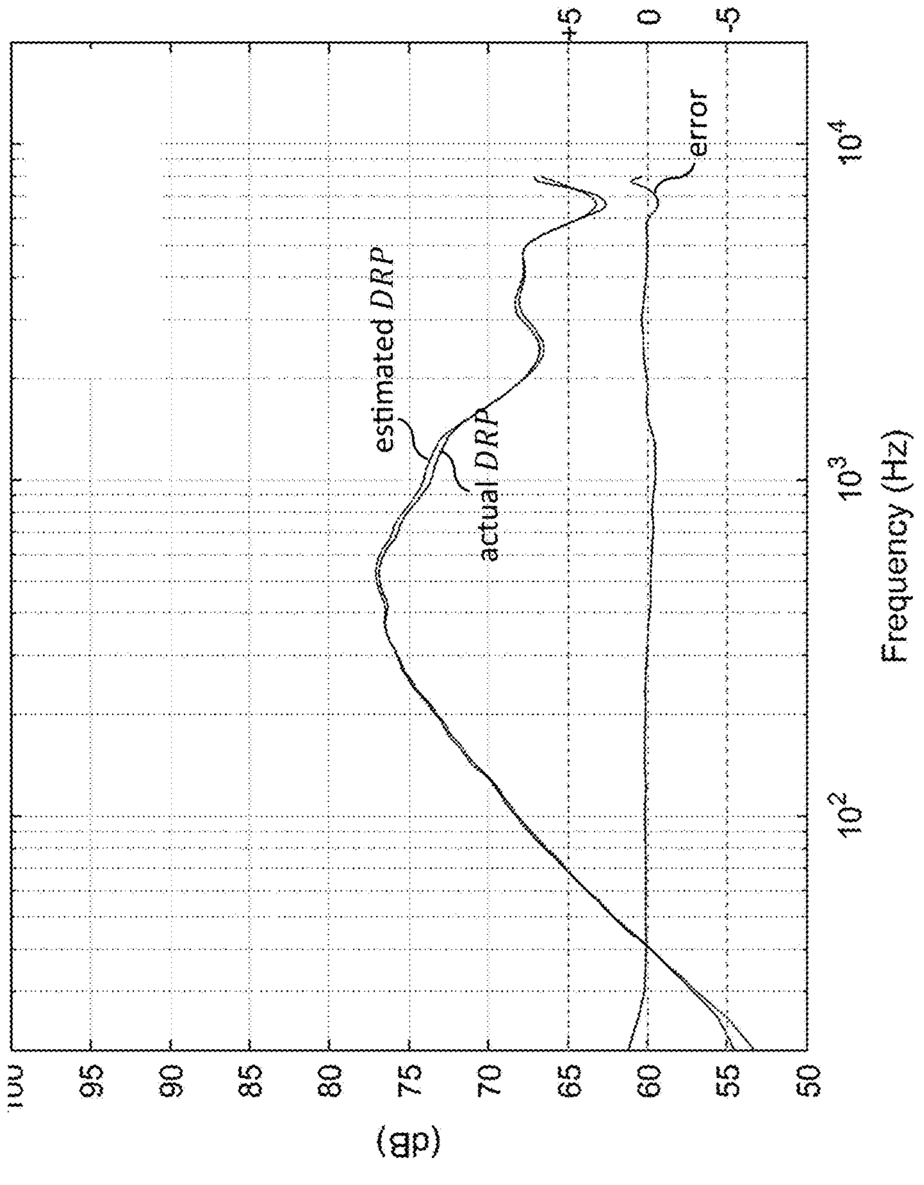
FIG. 6H illustrates an example graph plot comparing the estimated DRP using $G_{MODEL}$ against an actual DRP, in one or more embodiments.

FIG. 6H illustrates example graph plot 1190 comparing the estimated DRP using $G_{MODEL}$ against an actual DRP, in one or more embodiments. A horizontal axis of the graph plot 1190 represents frequency expressed in Hz. A first vertical axis of the graph plot 1190 represents sound pressure expressed in dB. A second vertical axis of the graph plot 1190 represents error. The graph plot 1190 includes: (1) a first curve ("estimated DRP") representing an estimated sound pressure at the DRP using $G_{MODEL}$, (2) a second curve ("actual DRP") representing an actual sound pressure at the DRP, and (3) a third curve ("error") representing a difference between the estimated DRP and the actual DRP.

Figure 6I:
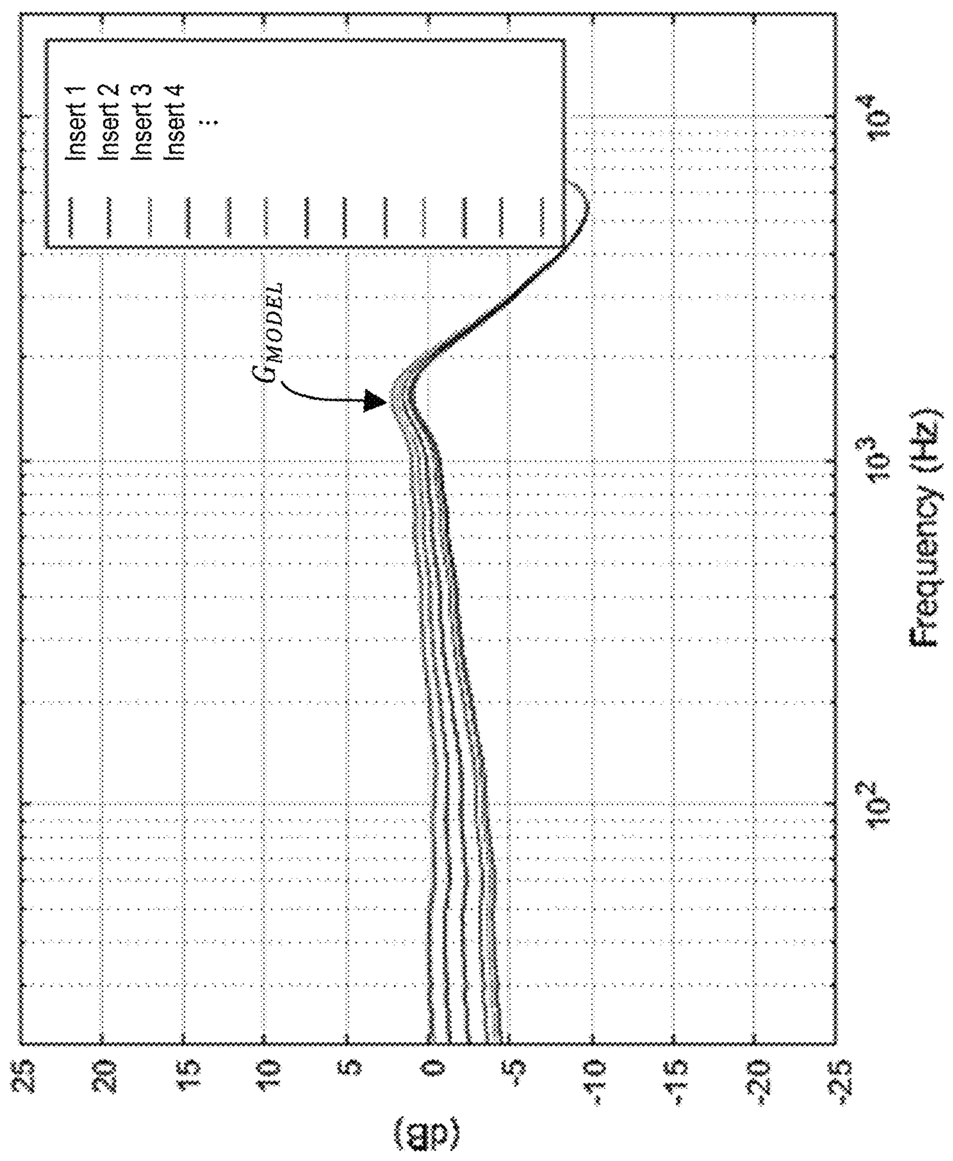
FIG. 6I illustrates an example graph plot of modeled individual transfer functions $G_{MODEL}$ for the 13 inserts, in one or more embodiments.

FIG. 6I illustrates an example graph plot 1200 of modeled individual transfer functions $G_{MODEL}$ for the 13 inserts, in one or more embodiments. A horizontal axis of the graph plot 1200 represents frequency expressed in Hz. A vertical axis of the graph plot 1200 represents sound pressure difference expressed in dB. The graph plot 1200 includes a first set of curves ("G") representing modeled individual transfer functions $G_{MODEL}$ (i.e., $G_{MODEL}$=DRP-NFM) for the 13 inserts. Compared to FIG. 6D, at low frequencies, the modeled individual transfer functions $G_{MODEL}$ for the 13 inserts provide air pressure leakage compensation.

Figure 7:
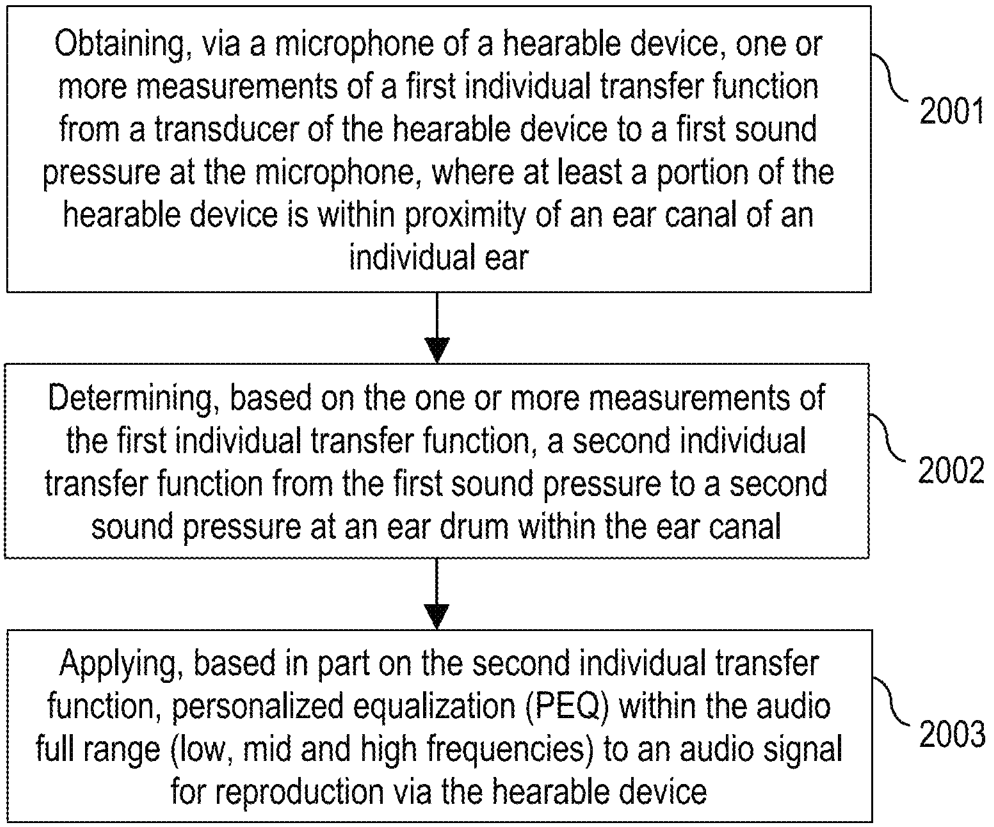
FIG. 7 is a flowchart of an example process for implementing PEQ, in one or more embodiments.

FIG. 7 is a flowchart of an example process 2000 for implementing PEQ, in one or more embodiments. Process block 2001 includes obtaining, via a microphone of a hearable device, one or more measurements of a first individual transfer function from a transducer of the hearable device to a first sound pressure at the microphone, wherein at least a portion of the hearable device is within proximity of an ear canal of an individual ear (e.g., inserted within the ear canal). Process block 2002 includes determining, based on the one or more measurements of the first individual transfer function, a second individual transfer function from the first sound pressure to a second sound pressure at an eardrum within the ear canal. Process block 2003 includes applying, based in part on the second individual transfer function, PEQ within the audio full range (low, mid and high frequencies) to an audio signal for reproduction via the hearable device.

In one embodiment, process blocks 2001-2003 may be performed by one or more components of the system 300 and/or the system 600.

Figure 8:
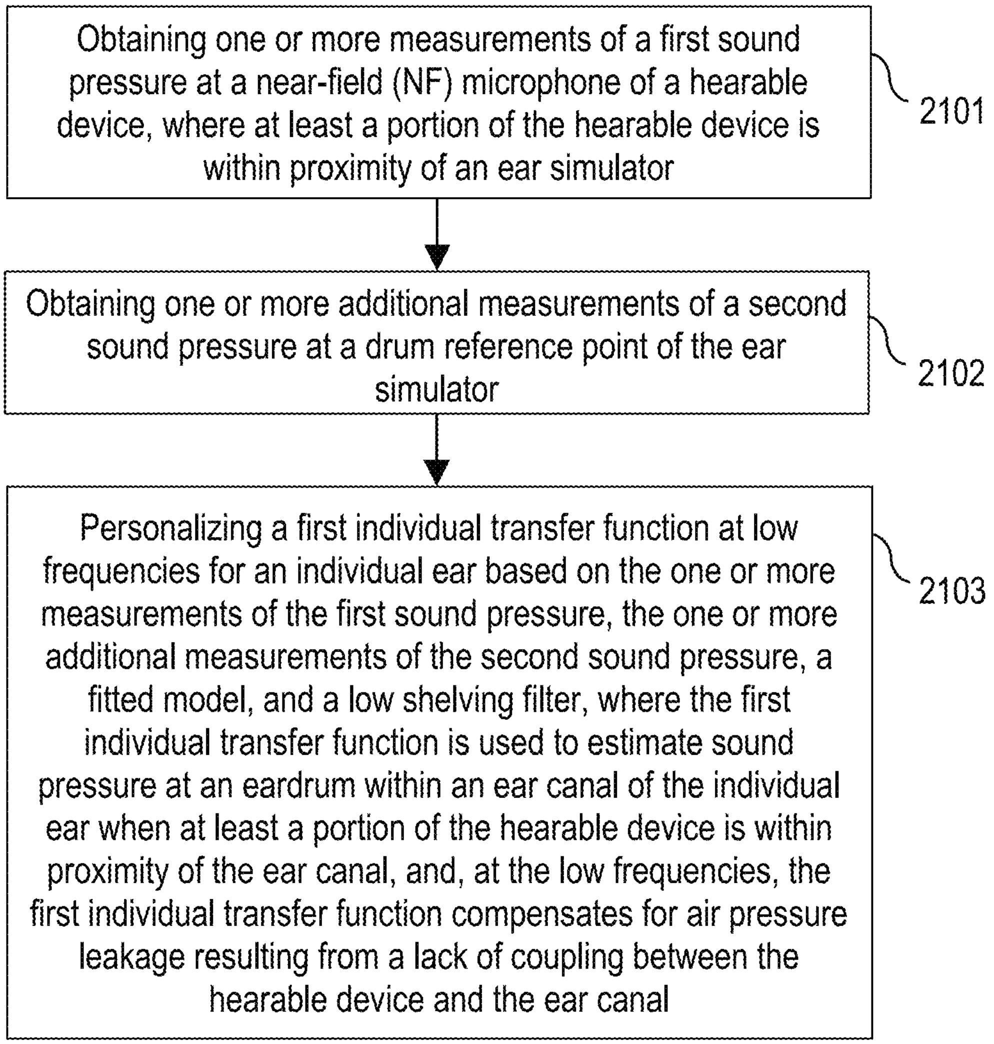
FIG. 8 is a flowchart of an example process for implementing air pressure leakage compensation at low frequencies, in one or more embodiments.

FIG. 8 is a flowchart of an example process 2100 for air pressure leakage compensation at low frequencies, in one or more embodiments. Process block 2101 includes obtaining one or more measurements of a first sound pressure at a NF microphone of a hearable device, wherein at least a portion of the hearable device is within proximity of an ear simulator (e.g., a head and torso simulator). Process block 2102 includes obtaining one or more additional measurements of a second sound pressure at a drum reference point of the ear simulator. Process block 2103 includes personalizing a first individual transfer function (e.g., $G_{MODEL}$ or $G_{new}$) at low frequencies for an individual ear based on the one or more measurements of the first sound pressure, the one or more additional measurements of the second sound pressure, a fitted model, and a low shelving filter, wherein the first individual transfer function is used to estimate sound pressure at an eardrum within an ear canal of the individual ear when at least a portion of the hearable device is within proximity of the ear canal, and, at the low frequencies, the first individual transfer function compensates for air pressure leakage resulting from a lack of coupling between the hearable device and the ear canal.

In one embodiment, process blocks 2101-2103 may be performed by one or more components of the system 300 and/or the system 600.

Figure 9:
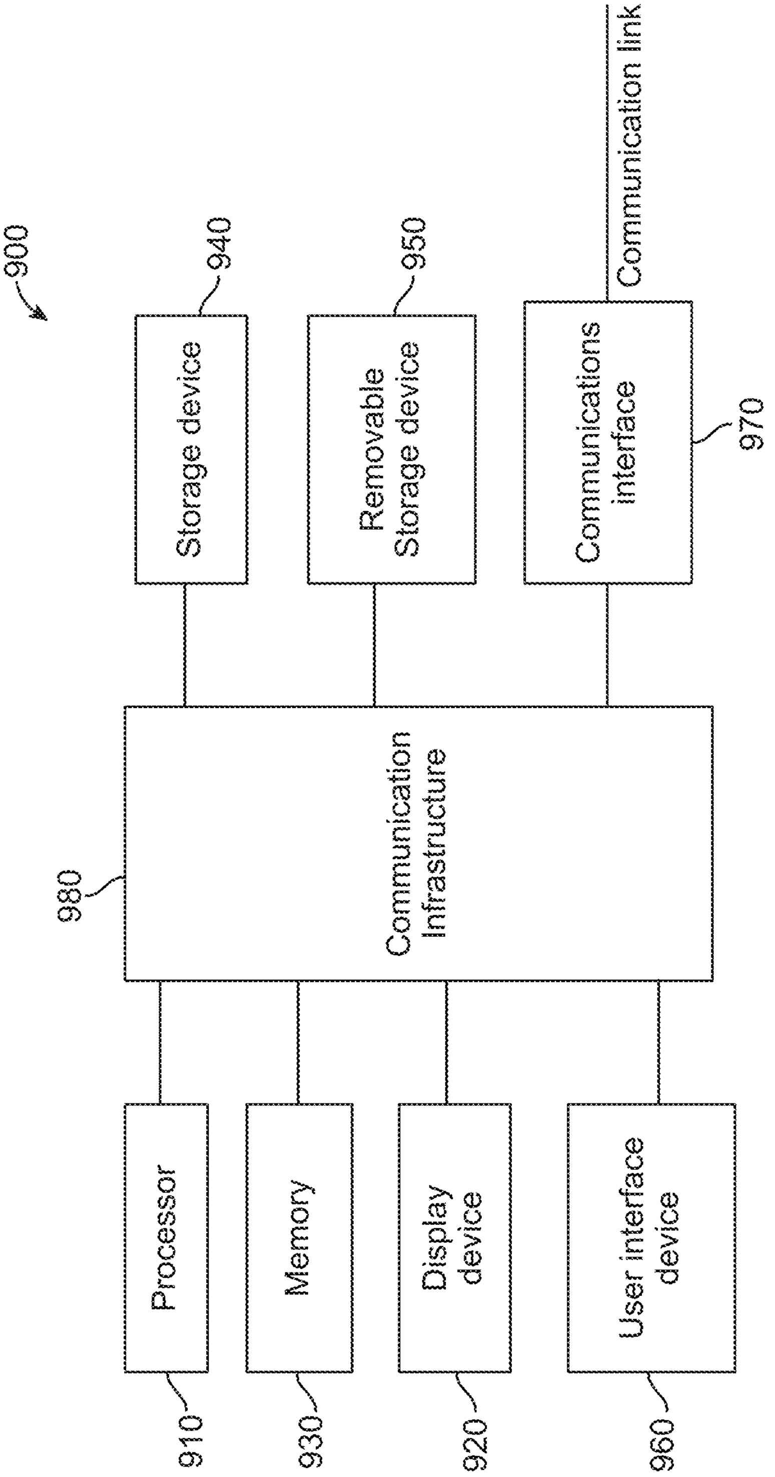
FIG. 9 is a high-level block diagram showing an information processing system comprising a computer system useful for implementing the disclosed embodiments.

FIG. 9 is a high-level block diagram showing an information processing system comprising a computer system 900 useful for implementing the disclosed embodiments. The system 300 may be incorporated in the computer system 900. The computer system 900 includes one or more processors 910, and can further include an electronic display device 920 (for displaying video, graphics, text, and other data), a main memory 930 (e.g., random access memory (RAM)), storage device 940 (e.g., hard disk drive), removable storage device 950 (e.g., removable storage drive, removable memory module, a magnetic tape drive, optical disk drive, computer readable medium having stored therein computer software and/or data), viewer interface device 960 (e.g., keyboard, touch screen, keypad, pointing device), and a communication interface 970 (e.g., modem, a network interface (such as an Ethernet card), a communications port, or a PCMCIA slot and card). The communication interface 970 allows software and data to be transferred between the computer system and external devices. The system 900 further includes a communications infrastructure 980 (e.g., a communications bus, cross-over bar, or network) to which the aforementioned devices/modules 910 through 970 are connected.

Information transferred via communications interface 970 may be in the form of signals such as electronic, electromagnetic, optical, or other signals capable of being received by communications interface 970, via a communication link that carries signals and may be implemented using wire or cable, fiber optics, a phone line, a cellular phone link, a radio frequency (RF) link, and/or other communication channels. Computer program instructions representing the block diagram and/or flowcharts herein may be loaded onto a computer, programmable data processing apparatus, or processing devices to cause a series of operations performed thereon to generate a computer implemented process. In one embodiment, processing instructions for processes 2000 (FIG. 7) and 2100 (FIG. 8) may be stored as program instructions on the memory 930, storage device 940, and/or the removable storage device 950 for execution by the processor 910.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the disclosed technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the disclosed technology.

Though the embodiments have been described with reference to certain versions thereof; however, other versions are possible. Therefore, the spirit and scope of the appended claims should not be limited to the description of the preferred versions contained herein.

What is claimed is:

1. A method comprising:

obtaining, via a microphone of a hearable device, one or more measurements of a first individual transfer function from a transducer of the hearable device to a first sound pressure at the microphone, wherein at least a portion of the hearable device is within proximity of an ear canal of an individual ear;

determining, based on the one or more measurements of the first individual transfer function, a second individual transfer function from the first sound pressure to a second sound pressure at an eardrum within the ear canal; and applying, based in part on the second individual transfer function, personalized equalization (PEQ), based on the one or more measurements of the first individual transfer function, to an audio signal for reproduction via the hearable device.

2. The method of claim 1, wherein the PEQ is further based on a pre-defined target sound pressure.

3. The method of claim 1, wherein the determining comprises using a parametric base transfer function with one or more parameters adjusted based on the one or more measurements of the first individual transfer function.

4. The method of claim 1, wherein the determining comprises estimating the second individual transfer function based on the one or more measurements of the first individual transfer function.

5. The method of claim 1, wherein the one or more measurements are iteratively obtained via the microphone.

6. The method of claim 5, wherein the determining comprises iteratively estimating the second individual transfer function based on the one or more measurements of the first individual transfer function.

7. The method of claim 1, wherein the hearable device comprises one of a pair of in-ear earbuds, a pair of on-ear headphones, or a pair of over-ear headphones.

8. The method of claim 1, wherein the portion of the hearable device is inserted within the ear canal.

9. A system comprising:

at least one processor; and a non-transitory processor-readable memory device storing instructions that when executed by the at least one processor causes the at least one processor to perform operations including:

obtaining, via a microphone of a hearable device, one or more measurements of a first individual transfer function from a transducer of the hearable device to a first sound pressure at the microphone, wherein at least a portion of the hearable device is within proximity of an ear canal of an individual ear;

determining, based on the one or more measurements of the first individual transfer function, a second individual transfer function from the first sound pressure to a second sound pressure at an eardrum within the ear canal; and applying, based in part on the second individual transfer function, personalized equalization (PEQ), based on the one or more measurements of the first individual transfer function, to an audio signal for reproduction via the hearable device.

10. The system of claim 9, wherein the PEQ is further based on a pre-defined target sound pressure.

11. The system of claim 9, wherein the determining comprises using a parametric base transfer function with one or more parameters adjusted based on the one or more measurements of the first individual transfer function.

12. The system of claim 9, wherein the determining comprises estimating the second individual transfer function based on the one or more measurements of the first individual transfer function.

13. The system of claim 9, wherein the one or more measurements are iteratively obtained via the microphone.

14. The system of claim 13, wherein the determining comprises iteratively estimating the second individual transfer function based on the one or more measurements of the first individual transfer function.

15. The system of claim 9, wherein the hearable device comprises one of a pair of in-ear earbuds, a pair of on-ear headphones, or a pair of over-ear headphones.

16. A non-transitory processor-readable medium that includes a program that when executed by a processor performs a method comprising:

obtaining, via a microphone of a hearable device, one or more measurements of a first individual transfer function from a transducer of the hearable device to a first sound pressure at the microphone, wherein at least a portion of the hearable device is within proximity of an ear canal of an individual ear;

determining, based on the one or more measurements of the first individual transfer function, a second individual transfer function from the first sound pressure to a second sound pressure at an eardrum within the ear canal; and applying, based in part on the second individual transfer function, personalized equalization (PEQ), based on the one or more measurements of the first individual transfer function, to an audio signal for reproduction via the hearable device.

17. The non-transitory processor-readable medium of claim 16, wherein the PEQ is further based on a pre-defined target sound pressure.

18. The non-transitory processor-readable medium of claim 16, wherein the determining comprises using a parametric base transfer function with one or more parameters adjusted based on the one or more measurements of the first individual transfer function.

19. The non-transitory processor-readable medium of claim 16, wherein the determining comprises estimating the second individual transfer function based on the one or more measurements of the first individual transfer function.

20. The non-transitory processor-readable medium of claim 16, wherein the one or more measurements are iteratively obtained via the microphone.

21. A method comprising:

obtaining one or more measurements of a first sound pressure at a near-field (NF) microphone of a hearable device, wherein at least a portion of the hearable device is within proximity of an ear simulator;

obtaining one or more additional measurements of a second sound pressure at a drum reference point of the ear simulator; and personalizing a first individual transfer function at low frequencies for an individual ear based on the one or more measurements of the first sound pressure, the one or more additional measurements of the second sound pressure, a fitted model, and a low shelving filter;

wherein the first individual transfer function is used to estimate sound pressure at an eardrum within an ear canal of the individual ear when at least a portion of the hearable device is within proximity of the ear canal, and, at the low frequencies, the first individual transfer function compensates for air pressure leakage resulting from a lack of coupling between the hearable device and the ear canal.

22. The method of claim 21, wherein the fitted model comprises a quadratic polynomial curve.

23. The method of claim 21, further comprising:

applying, based in part on the first individual transfer function, personalized equalization (PEQ) to an audio signal for reproduction via the hearable device.

24. The method of claim 21, further comprising:

determining a second individual transfer function for the ear simulator based on the one or more measurements of the first sound pressure and the one or more additional measurements of the second sound pressure;

wherein personalizing the first individual transfer function comprises applying the low shelving filter to the second individual transfer function.

25. A system comprising:

at least one processor; and a non-transitory processor-readable memory device storing instructions that when executed by the at least one processor causes the at least one processor to perform operations including:

obtaining one or more measurements of a first sound pressure at a near-field (NF) microphone of a hearable device, wherein at least a portion of the hearable device is within proximity of an ear simulator;

obtaining one or more additional measurements of a second sound pressure at a drum reference point of the ear simulator; and personalizing a first individual transfer function at low frequencies for an individual ear based on the one or more measurements of the first sound pressure, the one or more additional measurements of the second sound pressure, a fitted model, and a low shelving filter;

wherein the first individual transfer function is used to estimate sound pressure at an eardrum within an ear canal of the individual ear when at least a portion of the hearable device is within proximity of the ear canal, and, at the low frequencies, the first individual transfer function compensates for air pressure leakage resulting from a lack of coupling between the hearable device and the ear canal.

* * * * *